(12) United States Patent
Trotta et al.

(10) Patent No.: US 11,733,347 B2
(45) Date of Patent: Aug. 22, 2023

(54) DUAL-SIDED RADAR SYSTEMS AND METHODS OF FORMATION THEREOF

(71) Applicant: Infineon Technologies AG, Neubiberg (DE)

(72) Inventors: Saverio Trotta, Munich (DE); Reinhard-Wolfgang Jungmaier, Alkoven (AT); Adrian Mikolajczak, Los Altos, CA (US); Ashutosh Baheti, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 283 days.

(21) Appl. No.: 17/175,095

(22) Filed: Feb. 12, 2021

(65) Prior Publication Data
US 2021/0165072 A1 Jun. 3, 2021

Related U.S. Application Data

(62) Division of application No. 15/724,953, filed on Oct. 4, 2017, now Pat. No. 10,921,420.

(51) Int. Cl.
*G01S 7/03* (2006.01)
*G01S 13/88* (2006.01)
*G01S 13/66* (2006.01)
*G01S 13/04* (2006.01)
*H01Q 25/00* (2006.01)

(52) U.S. Cl.
CPC ............ *G01S 7/032* (2013.01); *G01S 13/66* (2013.01); *G01S 13/88* (2013.01); *G01S 13/04* (2013.01); *H01Q 25/005* (2013.01)

(58) Field of Classification Search
CPC .......... G01S 7/032; G01S 13/66; G01S 13/88; H01Q 25/005
See application file for complete search history.

(56) References Cited

U.S. PATENT DOCUMENTS

| 6,307,518 B1 | 10/2001 | Hamper et al. |
| 8,912,968 B2 | 12/2014 | Sharma et al. |
| 2007/0069955 A1 | 3/2007 | McCorkle |

(Continued)

FOREIGN PATENT DOCUMENTS

| CN | 102208717 A | 10/2011 |
| DE | 102014016805 A1 | 5/2016 |

(Continued)

*Primary Examiner* — Matthew M Barker
(74) *Attorney, Agent, or Firm* — Slater Matsil, LLP

(57) ABSTRACT

A method of forming a radar system includes forming a first receive antenna and a first ground plane region by patterning a first conductive layer on a first surface of a first laminate layer of a radar package, forming a transmit antenna and a second ground plane region by patterning a second conductive layer on a second surface of the first laminate layer, forming a second laminate layer of the radar package over the second conductive layer, forming a third conductive layer over the second laminate layer, forming a second receive antenna by patterning the third conductive layer, and attaching a radio frequency integrated circuit chip to the radar package. The radio frequency integrated circuit chip is coupled to the transmit antenna, the first receive antenna, and the second receive antenna. The second surface is opposite the first surface.

20 Claims, 17 Drawing Sheets

(56) References Cited

U.S. PATENT DOCUMENTS

| | | |
|---|---|---|
| 2012/0112957 A1 | 5/2012 | Nguyen et al. |
| 2012/0194377 A1 | 8/2012 | Yukumatsu et al. |
| 2013/0234912 A1 | 9/2013 | Kouchi et al. |
| 2016/0178730 A1 | 6/2016 | Trotta et al. |
| 2019/0101636 A1 | 4/2019 | Trotta et al. |

FOREIGN PATENT DOCUMENTS

| | | | |
|---|---|---|---|
| DE | 102016210366 B3 | 9/2017 | |
| EP | 3211977 A1 * | 8/2017 | ............... H01Q 1/38 |
| GB | 2328748 A | 3/1999 | |
| JP | 2006217047 A | 8/2006 | |

\* cited by examiner

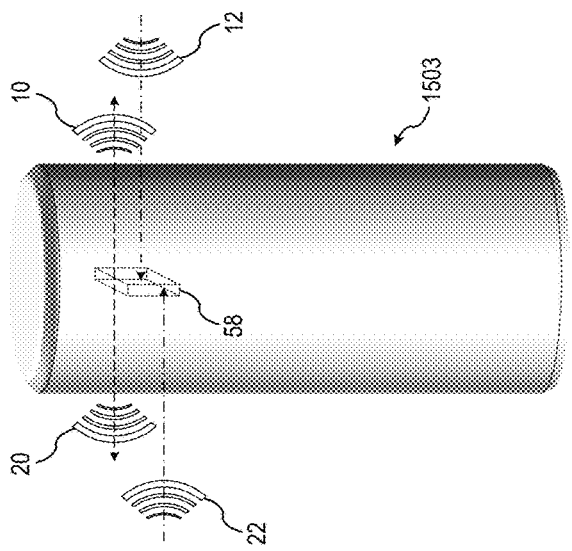
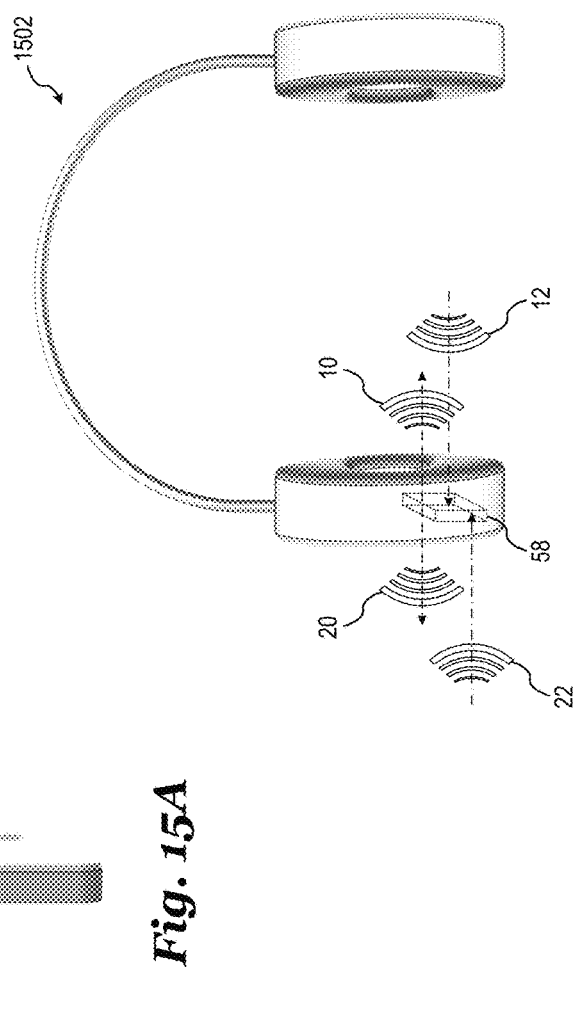
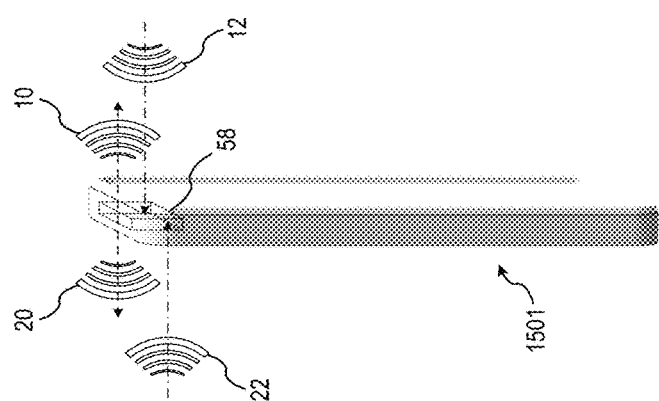
Fig. 15A
Fig. 15B
Fig. 15C

US 11,733,347 B2

DUAL-SIDED RADAR SYSTEMS AND METHODS OF FORMATION THEREOF

This application is a divisional application of U.S. application Ser. No. 15/724,953, filed on Oct. 4, 2017, which application is incorporated herein by reference in its entirety.

TECHNICAL FIELD

The present invention relates generally to a radar system, and, in particular embodiments, to dual-sided radar system structures, methods of formation, and methods of operation thereof.

BACKGROUND

Portable devices such as tablets, smart phones, and smart watches have become popular recently due to the rapid advancement in low-cost semiconductor technologies. Portable devices may need to acquire information about objects on opposing sides of the device to perform autofocusing of a camera or for shutting the screen off during a phone conversation, as examples. Various implementations may be used to accomplish this including laser ranging and time-of-flight (ToF) modules. However such modules may be expensive and/or require openings in the housing of the portable device. Therefore, portable devices which incorporate alternative means of acquiring information about objects on opposing sides of the device may be desirable to decrease cost, improve functionality, and increase resilience of the device housing.

SUMMARY

In accordance with an embodiment of the invention, a radar system includes a substrate. The substrate includes a first surface and a second surface. The first surface is opposite the second surface. The radar system further includes transmitter front-end circuitry attached to the substrate. The transmitter front-end circuitry is configured to transmit a transmitted radio frequency (RF) signal in a first direction away from the first surface and in a second direction away from the second surface. The radar system also includes a first receive antenna and a second receive antenna. The first receive antenna is disposed at the first surface and is configured to receive a first reflected RF signal propagating in the second direction. The first reflected RF signal is generated by the transmitted RF signal. The second receive antenna is disposed at the second surface and is configured to receive a second reflect RF signal propagating in the first direction. The second reflected RF signal is generated by the transmitted RF signal.

In accordance with another embodiment of the invention, a method of operating a radar system includes transmitting, by transmitter front-end circuitry attached to a substrate, a transmitted radio frequency (RF) signal in a first direction away from a first surface of the substrate and in a second direction away from a second surface of the substrate. The first direction is opposite the first direction. The method of operating the radar system further includes receiving, by a first receive antenna disposed at the first surface of the substrate, a first reflected RF signal generated by the transmitted RF signal. The first reflected RF signal is propagating in the second direction. The method of operating the radar system also includes receiving, by a second receive antenna disposed at the second surface of the substrate, a second reflected RF signal generated by the transmitted RF signal. The second reflected RF signal is propagating in the first direction.

In accordance with still another embodiment of the invention, a method of forming a radar system includes forming a first receive antenna and a first ground plane region by patterning a first conductive layer on a first surface of a first laminate layer of a radar package and forming a transmit antenna and a second ground plane region by patterning a second conductive layer on a second surface of the first laminate layer. The second surface is opposite the first surface. The method of forming the radar system further includes forming a second laminate layer of the radar package over the second conductive layer, forming a third conductive layer over the second laminate layer, forming a second receive antenna by patterning the third conductive layer, and attaching a radio frequency integrated circuit (RFIC) chip to the radar package. The RFIC is coupled to the transmit antenna, the first receive antenna, and the second receive antenna.

BRIEF DESCRIPTION OF THE DRAWINGS

For a more complete understanding of the present invention, and the advantages thereof, reference is now made to the following descriptions taken in conjunction with the accompanying drawings, in which:

FIG. 6A illustrates a top view of the radar package and FIG. 6B illustrates a three-dimensional view of the relative locations of antennas and ground planes within the radar package;

FIG. 7A illustrates a top view of the radar package and FIG. 7B illustrates a three-dimensional view of the relative locations of antennas and ground planes within the radar package;

FIG. 8A illustrates a top view of the radar package and FIG. 8B illustrates a three-dimensional view of the relative locations of antennas and ground planes within the radar package;

FIG. 9A illustrates a top view of the radar package and FIG. 9B illustrates a three-dimensional view of the relative locations of antennas and ground planes within the radar package;

FIG. 10A illustrates a top view of the radar package and FIG. 10B illustrates a three-dimensional view of the relative locations of antennas and ground planes within the radar package;

FIG. 11A illustrates steps 1102 through 1116 and FIG. 11B illustrates steps 1118 through 1130;

FIG. 15A illustrates an example gesture recognition application in which a mobile phone includes a radar package, FIG. 15B illustrates an example gesture recognition application in which a pair of headphones include a radar package, and FIG. 15C illustrates an example gesture recognition application in which a personal assistant device includes a radar package in accordance with embodiments of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Portable devices may utilize multiple antenna elements for beamforming, transmit diversity and MIMO configurations, and as radar sensors that can detect user motions (known as gesture sensors). Gesture sensors may be configured in a portable device as an interface to control functionality of the device as well as to gather information about objects in the area around the portable device.

In various embodiments, a radar-based gesture detection system is used to directly control a device such as a computer, a smartphone, or a tablet computer, or to control a remote device such as a vehicle, an electronic system within a building, or a home appliance. For example, when the remote device is a car, an embodiment gesture detection system allows a human actor to control various operations of the car from outside the car.

Figure 1A:
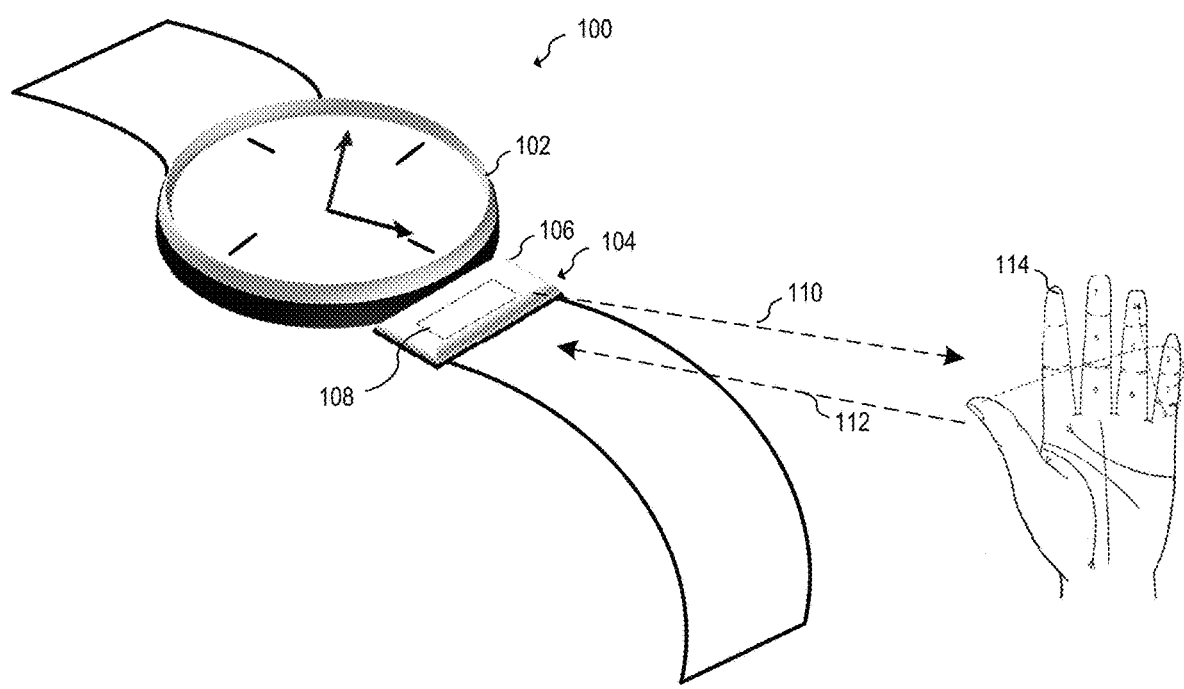
FIG. 1A illustrates an example gesture recognition application in which a smartwatch is controlled using various hand gestures.

FIG. 1A illustrates an example radar system application in which a smartwatch 100 is controlled using various hand gestures. As shown, smartwatch 100 includes a display element 102 physically coupled to a radar system 104. During operation, radar system 104 transmits RF signals 110 to target 114, which may be a human hand, and receives reflected RF signals 112 that are reflected by target 114. These reflected RF signals 112 are processed by the radar system to determine the position and motion of target 114 and/or to determine whether target 114 is providing a particular gesture. In some embodiments, radar system 104 may include a radar system circuit 108 that is disposed within a housing 106. At least a portion of housing 106 is transparent or partially transparent to RF signals transmitted and received by radar system circuit 108. It should be appreciated that radar system circuit 108 may also be disposed within the body of display element 102.

In alternative embodiments, radar system circuit 108 may be embedded within other devices including, but not limited to, car keys, smart phones, tablet computers, audio/visual equipment, kitchen appliances, HVAC controls, and automobiles. In some applications, such as automotive applications, radar system circuit 108 may be embedded within a mobile device such as a car key or smart phone, which in turn communicates with a remote device to be controlled, such as an automobile or kitchen appliance. The data transfer between the mobile device and remote device could include any of a wide variety of communications technologies, including, e.g., Bluetooth, V2X, etc.

Figure 1B:
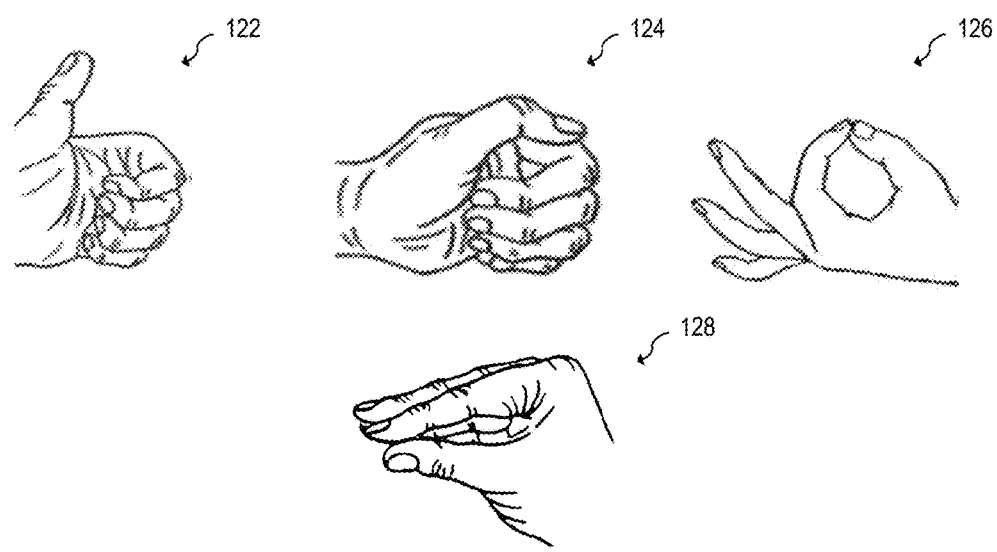
FIG. 1B illustrates various example hand gestures that may be used to control a smartwatch.

Example hand gestures shown in FIG. 1B may include, for example, a "thumbs-up" gesture 122, a "closed fist" gesture 124, a "thumb-to-finger" gesture 126, or a "button press" gesture 128. Each of these example gestures could be used to control the functionality of smartwatch 100 or some other device or system. For example, "thumbs-up" gesture 122 could be used to open a smartwatch application, "closed fist" gesture 124 could be used to close the smartwatch application, "thumb-to-finger" gesture 126 in conjunction with motion between the thumb and index finger may be used to virtually rotate the hands on the clock display of smartwatch 100, and "button press" gesture 128 could be used to start and stop a stopwatch feature of smartwatch 100. In various embodiments, recognized gestures may be static or dynamic. Static gestures may be made by holding a hand in a fixed position such as the gestures 122, 124 and 128, and dynamic gestures may be made by moving the hand or a portion of the hand, such as moving the index finger with respect to the thumb such as with gesture 126. It should be understood that the above-mentioned gestures are just a few examples of many possible gestures that may be recognized by embodiment radar systems.

Figure 1C:
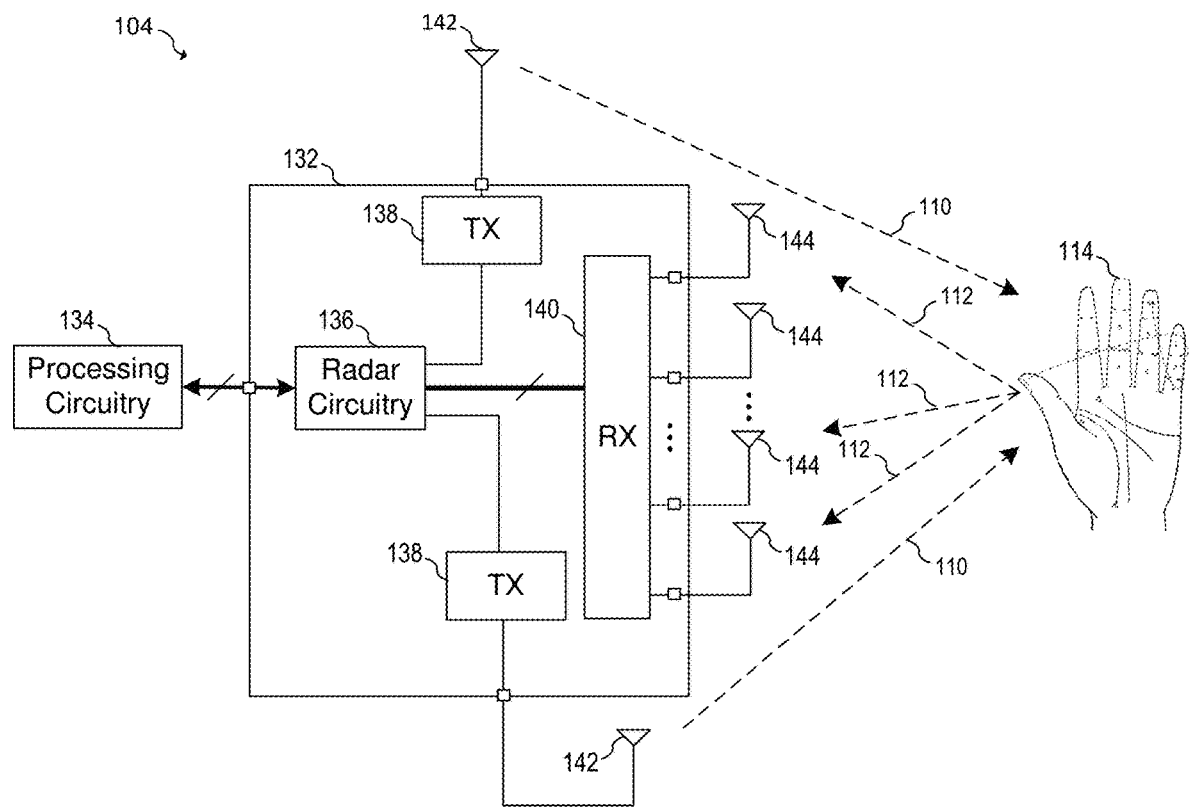
FIG. 1C illustrates a block diagram of a radar system that includes a radar front end circuit and processing circuitry.

FIG. 1C illustrates a block diagram of radar system 104 that includes radar front-end circuit 132 and processing circuitry 134. During operation, positions and gestures of target 114 may be detected by the radar system 104. For example, a gesture of two fingers tapping each other could be interpreted as a "button press," or a gesture of a rotating thumb and finger may be interpreted as turning a dial. While target 114 is depicted in FIG. 1C as being a hand, radar system 104 may also be configured to determine gestures and positions of other types of targets such as a human body, machinery and other types of animate or inanimate objects. Radar system 104 may be implemented, for example, using a two-dimensional mm-wave phase-array radar that measures the position and relative speed of target 114. The mm-wave phase-array radar transmits and receives signals in the 50 GHz to 80 GHz range. Alternatively, frequencies outside of this range may also be used. In some embodiments, radar front-end circuit 132 operates as a frequency modulated continuous wave (FMCW) radar sensor having multiple transmit and receive channels.

Radar front-end circuit 132 transmits and receives radio signals for detecting target 114 in three-dimensional space. For example, radar front-end circuit 132 transmits an incident RF signal and receives a RF signal that is a reflection of the incident RF signal from target 114. The received reflected RF signal is downconverted by radar front-end circuit 132 to determine beat frequency signals. These beat frequency signals may be used to determine information such as the location, speed, angle, etc., of target 114 in three-dimensional space.

In various embodiments, radar front-end circuit 132 is configured to transmit incident RF signals toward target 114 via transmit antennas 142 and to receive reflected RF signals from target 114 via receive antennas 144. Radar front-end circuit 132 includes transmitter front-end circuits 138 coupled to transmit antennas 142 and receiver front-end circuit 140 coupled to receive antennas 144.

During operation, transmitter front-end circuits 138 may transmit RF signals toward target 114 one at a time or simultaneously. While two transmitter front-end circuits 138 are depicted in FIG. 1C, it should be appreciated that radar front-end circuit 132 may include fewer or greater than two transmitter front-end circuits 138. Each transmitter front-end circuit 138 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 140 receives and processes the reflected RF signals from target 114. As shown in FIG. 1C, receiver front-end circuit 140 is configured to be coupled to four receive antennas 144, which may be configured as a 2×2 antenna array. In alternative embodiments, receiver front-end circuit 140 may be configured to be coupled to greater or fewer than four antennas, with the resulting antenna array being of various n×m dimensions depending on the specific embodiment and its specifications. Receiver front-end circuit 140 may include, for example, RF oscillators, upconverting mixers, RF amplifiers, variable gain amplifiers, filters, transformers, power combiners and other types of circuits.

Radar circuitry 136 provides signals to be transmitted to transmitter front-end circuits 138, receives signals from receiver front-end circuit 140, and may be configured to control the operation of radar front-end circuit 132. In some embodiments, radar circuitry 136 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 136 may receive a baseband radar signal from processing circuitry 134 and control a frequency of an RF oscillator based on the received baseband signal. In some embodiments, this received baseband signal may represent a FMCW frequency chip to be transmitted. Radar circuitry 136 may adjust the frequency of the RF oscillator by applying a signal proportional to the received baseband signal to a frequency control input of a phase locked loop. Alternatively, the baseband signal received from processing circuitry 134 may be upconverted using one or more mixers. Radar circuitry 136 may transmit and digitize baseband signals via a digital bus (e.g., a USB bus), transmit and receive analog signals via an analog signal path, and/or transmit and/or receive a combination of analog and digital signals to and from processing circuitry 134.

Processing circuitry 134 acquires baseband signals provided by radar circuitry 136 and performs one or more signal processing steps to evaluate them. In an embodiment, processing circuitry 134 acquires a baseband signal that represents the beat frequency signals. The signal processing steps may include performing a fast Fourier transform (FFT), a short-time Fourier transform (STFT), target classification, machine learning, and the like. Results of the signal processing steps are used to determine and perform an action on the device, such as smartwatch 100 of FIG. 1A. In addition to processing the acquired baseband signals, processing circuitry 134 may also control aspects of radar front-end circuit 132, such as the transmissions produced by radar front-end circuit 132.

The various components of radar system 104 may be partitioned in various ways. For example, radar front-end circuit 132 may be implemented on one or more RF integrated circuits (RFICs), antennas 142 and 144 may be disposed on a circuit board, and processing circuitry 134 may be implemented using a processor, a microprocessor, a digital signal processor and/or a custom logic circuit disposed on one or more integrated circuits/semiconductor substrates. Processing circuitry 134 may include a processor that executes instructions stored in a non-transitory memory to perform the functions of processing circuitry 134. In some embodiments, however, all or part of the functionality of processing circuitry 134 may be incorporated on the same integrated circuit/semiconductor substrate on which radar front-end circuit 132 is disposed.

In some embodiments, some or all portions of radar front-end circuit 132 may be implemented in a package that contains transmit antennas 142, receive antennas 144, transmitter front-end circuits 138, receiver front-end circuit 140, and/or radar circuitry 136. In some embodiments, radar front-end circuit 132 may be implemented as one or more integrated circuits disposed on a circuit board, and transmit antennas 142 and receive antennas 144 may be implemented on the circuit board adjacent to the integrated circuits. In some embodiments, transmitter front-end circuits 138, receiver front-end circuit 140, and radar circuitry 136 are formed on a same radar front-end integrated circuit (IC) die. Transmit antennas 142 and receive antennas 144 may be part of the radar front-end IC die, or may be separate antennas over or adjacent to the radar front-end IC die. The radar front-end IC die may further include conductive layers, such as redistribution layers (RDLs), used for routing and/or for the implementation of various passive or active devices of radar front-end circuit 132. In an embodiment, transmit antennas 142 and receive antennas 144 may be implemented using the RDLs of the radar front-end IC die.

Figure 1D:
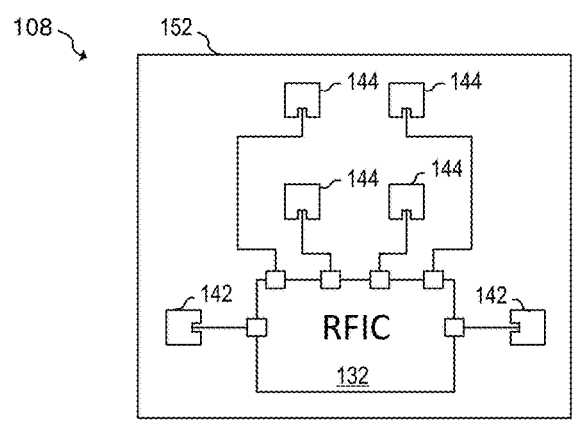
FIG. 1D illustrates a plan view of a radar system circuit that includes a radar front end circuit implemented as a radio frequency integrated circuit in accordance with embodiments of the invention.

FIG. 1D illustrates a plan view of radar system circuit 108 that includes radar front-end circuit 132 implemented as an RFIC coupled to transmit antennas 142 and receive antennas 144 implemented as patch antennas disposed on or within substrate 152. In some embodiments, substrate 152 may be implemented using a circuit board on which radar front-end circuit 132 is disposed and on which transmit antennas 142 and receive antennas 144 are implemented using conductive layers of the circuit board. Alternatively, substrate 152 represents a wafer substrate on which one or more RDLs are disposed and on which transmit antennas 142 and receive antennas 144 are implemented using conductive layers on the one or more RDLs. It should be appreciated that the implementation of FIG. 1D is just one of many ways that embodiment radar systems may be implemented.

In addition to gesture sensing, a radar system may also provide information about objects in the environment surrounding the portable device. For example, a radar system may sense the presence of an object, determine the physical location of an object, track movement of an object in one, two, or three dimensions, measure the size of an object, determine the material composition of an object, and/or determine the identity of an object.

In various applications, a portable device may benefit from radar functionality on two opposing sides of the portable device. In these applications, a dual-sided radar may be implemented that provides radar functionality to both sides. For example, a smart phone or a tablet may have cameras on both sides of the device. Autofocusing may be performed on both sides using the dual-sided radar. Additional functionality such as the ability to track movement of objects may be used to rapidly adjust focus and prevent blurred images while recording video or rapidly capturing images.

Additional applications of dual-sided radar systems may include material identification, blood pressure tracking, pulse rate monitoring, collision avoidance, object identification and activity identification, audio source tracking, contact tracking, and biometric identification. For example, a smartwatch may use the front-facing radar of a dual-sided radar system to gesture sensing while using the back-facing radar for blood pressure monitoring, pulse rate monitoring, and contact tracking to know if a user is wearing the watch or if it is on the charger. As another example, a portable device may utilize a dual-sided radar system to track an audio source in a room to filter out unwanted additional noise and/or to determine the identity of a speaker.

As still another example, an augmented reality/virtual reality (AR/VR) device may use the back-facing radar of a dual-sided radar system for biometrics and contact tracking while using the front-facing radar to accurately overlay images and/or information onto the physical environment in front of a user and also as a collision avoidance system to alert the user if a physical object is too close. Such an AR/VR device may also detected shoulder and arm movements of a user as input to increase realism in a simulation or as commands to the AR/VR device.

Radar systems may also be used to obtain detailed information about objects in the environment surrounding the radar system. For example, a user may direct the back-facing camera of a smart phone or a tablet at a group of people and receive an overlay on the screen that includes the distance, height, and pulse rate of individual people as well as object information such as material composition, size, and object identities. Such enhanced imaging may also be used in AR/VR devices to quickly provide information to a user.

In various embodiments, a dual-sided radar system includes one or more transmit antennas attached to a substrate. The one or more transmit antennas are configured to transmit a first RF signal in first direction away from a front side of the dual-sided radar system and a second RF signal in a second direction away from an opposite back side of the dual-sided radar system. The dual sided radar system also includes a first receive antenna configured to receive RF signals at the front side of the dual-sided radar system and second receive antenna configured to receive RF signals at the back side of the dual-sided radar system. The RF signals received by the first receive antenna may be generated by the first RF signal reflecting off of one or more objects located at a distance on the front side of the dual-sided radar system. The RF signals received by the second receive antenna may be generated by the second RF signal reflecting off of one or more objects located at a distance on the back side of the dual-sided radar system.

The dual-sided radar system may further include RF circuitry configured to detect objects located in the regions on the front side and the back side of the dual-sided radar system. For example, the RF circuitry may determine the location of a first object located some distance from the dual-sided radar system on the front side according to a reflected RF signal generated by the first RF signal and received by the first receive antenna. Likewise, the RF circuitry may determine the location of a second object located some other distance from the dual-sided radar system on the back side according to another reflected RF signal generated by the second RF signal and receive by the second receive antenna.

A dual-side radar system may include a front-facing radar tailored for short range detection and a back-facing radar tailored for long range detection. For example, the front-facing radar may be configured to have an optimal range of 0.1 m to 2.5 m while the back-facing radar may be configured to have an optimal range of 3 m to 5 m. An optimal range for a radar system does not indicate that the radar is inoperable outside of the optimal range, but may instead indicate an intended range of operation or a range within which information obtained is accurate to a certain tolerance.

Dual-sided radar systems may advantageously provide similar capabilities as other non-radar modules with lower power consumption, smaller module size, better accuracy, longer range, and increased versatility. For example, a portable device utilizing conventional ToF modules for autofocusing may require multiple ToF modules, consume more power and have lower accuracy under low-light conditions. In contrast, a dual-sided radar system may have a single radar module that is smaller than a single ToF module, consumes less power, and is unaffected by ambient light as well as providing additional functionality such as the features described above.

Additionally, conventional range detecting systems using lasers or ToF typically require an opening in the housing of the portable device because many common housing materials are not transparent to the visible and/or infrared spectrum. For example, most of the housing of a portable device that includes a conventional laser module of ToF module may be opaque to visible and/or infrared light while an opening including a transparent glass or plastic is included overlapping the laser module or ToF module. Dual-sided radar systems may advantageously allow for housings that do not include openings over the radar module which may in turn allow for better environmental resistance for the portable device as well as improving housing aesthetics.

Embodiments provided below describe various structures, methods of forming, and methods of operating a radar system, and in particular, radar systems that include a dual-sided radar module. The following description describes the embodiments. An embodiment radar system is described using FIGS. 2A, 2B, and 2C. An embodiment radar package is described using FIG. 3. An embodiment laminate radar package is described using FIG. 4. An embodiment radar system is described using FIG. 5. Several embodiment radar packages are described using FIGS. 6A-10B. An embodiment method of forming a radar system is described using FIGS. 11A and 11B. Three embodiment methods of operating a radar system are described using FIGS. 12-14. Three embodiment gesture recognition applications are described using FIGS. 15A, 15B, and 15C.

Figure 2A:
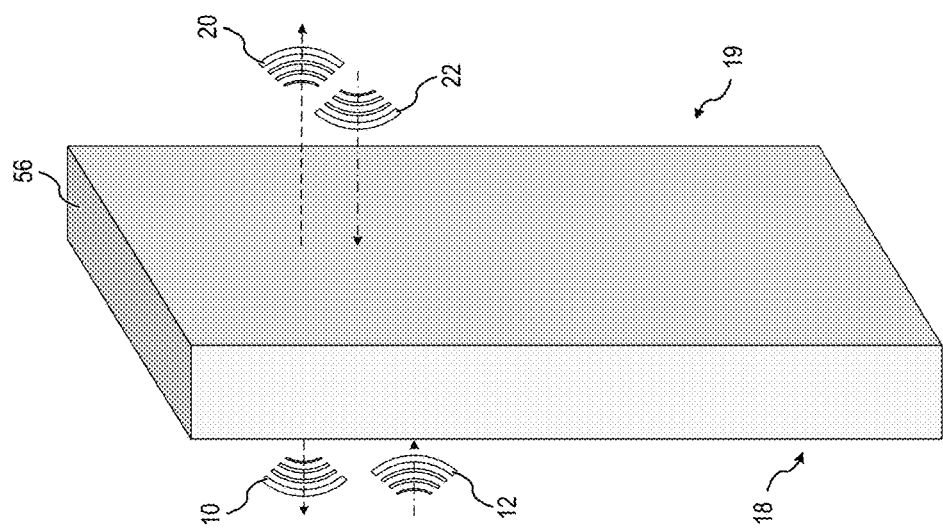
FIG. 2A illustrates an example radar system including a radar package attached to a printed circuit board.
Figure 2B:
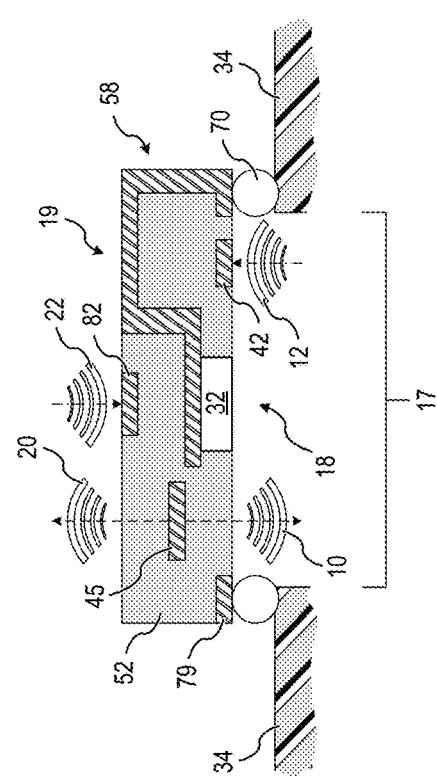
FIG. 2B illustrates a cross-sectional view of the radar package including a transmit antenna, a front receive antenna, and a back receive antenna.
Figure 2C:
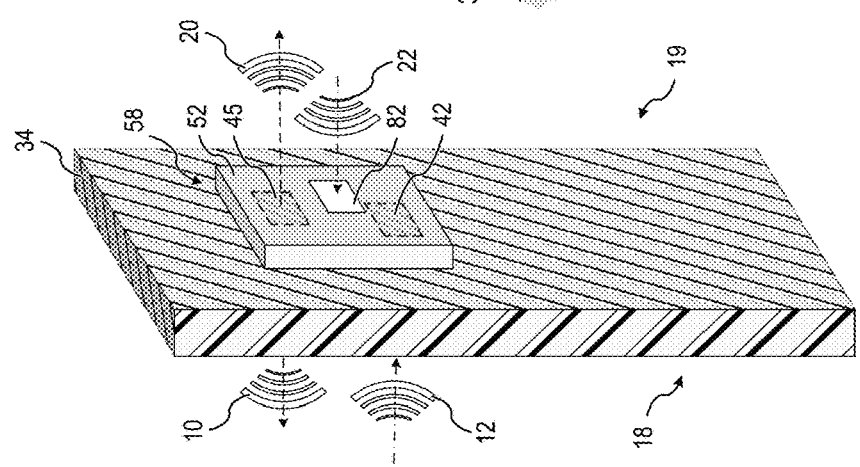
FIG. 2C illustrates a housing enclosing the printed circuit board and the radar package in accordance with embodiments of the invention.

FIG. 2A illustrates an example radar system including a radar package attached to a printed circuit board, FIG. 2B illustrates a cross-sectional view of the radar package including a transmit antenna, a front receive antenna, and a back receive antenna, and FIG. 2C illustrates a housing enclosing the printed circuit board and the radar package in accordance with embodiments of the invention.

Referring to FIG. 2A, an example radar system includes a radar package 58 attached to a printed circuit board (PCB) 34. The PCB 34 may include additional electronic devices, processors, memory, and the like. In various embodiments, the PCB 34 is a main board for an electronic device including the radar system. For example, the PCB 34 may be the main board for a smartwatch, cellular device, laptop computer, or IoT device, virtual reality headset, radar module in a vehicle, and the like.

The radar package 58 includes a transmit antenna 45 attached to a substrate 52. In various embodiments, the transmit antenna 45 is configured to transmit an RF signal in one or more directions outwardly from substrate 52 and the radar package 58. In one embodiment, transmit antenna 45 is an omnidirectional antenna. In other embodiments, transmit antenna 45 is a directional antenna and is implemented as a patch antenna in one embodiment. In some cases transmit antenna 45 may be implemented as an array of antenna elements.

The transmit antenna 45 may transmit a front side transmitted RF signal 10 directed away from a front side 18 of the radar system and a back side transmitted RF signal 20 directed away from a back side 19 of the radar system. As illustrated, the front side 18 and the back side 19 of the radar system may be opposite directions. In some implementations the front side transmitted RF signal 10 and the back side transmitted RF signal 20 may not be transmitted in exactly opposite directions and instead be in substantially opposite directions. The transmit antenna 45 may transmit in only one direction or in more directions depending on specific implementations.

Front side transmitted RF signal 10 and back side transmitted RF signal 20 may be identical or substantially similar. For example, both the front side transmitted RF signal 10 and the back side transmitted RF signal 20 may be fed from the same transmission line. In other implementations, front side transmitted RF signal 10 and back side transmitted RF signal 20 may by fed from different sources and be substantially different from one another.

The radar package 58 also includes a front side receive antenna 42 and a back side receive antenna 82 attached to the substrate 52. Front side receive antenna 42 is configured to receive a front side reflected RF signal 12 propagating in a substantially opposite direction as front side transmitted RF signal 10. The front side reflected RF signal 12 is received at the front side receive antenna 42 on the front side 18 of substrate 52. Front side reflected RF signal 12 may be generated by the front side transmitted RF signal 10. For example, front side transmitted RF signal 10 may be reflected by objects in the region on the front side 18 of the radar system.

Back side receive antenna 82 is similarly configured to receive a back side reflected RF signal 22 propagating in substantially the opposite direction as back side transmitted RF signal 20. The back side reflected RF signal 22 is receive at the back side receive antenna 82 on the back side 19 of substrate 52. Back side reflected RF signal 22 may be generated by the back side transmitted RF signal 20 as a result of objects and/or the environment on the back side 19 region of the radar system.

A number of properties of the transmitted RF signals may be affected by objects and/or the environment which may then be measureable by the radar system from the received reflected RF signals. These properties may include signal amplitude, frequency, phase information, and the like. The properties may in turn be interpreted to obtain information about the region surrounding the radar system. A possible advantage of radar package 58 is the ability to obtain radar information in the regions on both sides of a single substrate 52.

Referring now to FIG. 2B, a cross-sectional view is shown of radar package 58 including an integrated circuit (IC) chip 32. The IC chip 32 may include RF front end circuitry in addition to other circuitry and may be configured to process RF signals transmitted and received at antennas included in the radar system and is an RFIC in one embodiment.

In various embodiments, the RF front end circuitry is designed to operate in a super high frequency (SHF) or an extremely high frequency (EHF) regime. For example, the IC chip 32 may contain millimeter wave (MMW) circuitry designed to operate in the unlicensed band from 57 GHz to 64 GHz. Additionally or alternatively, the IC chip 32 may contain circuitry designed to operate in the 28 GHz regime (in 5G applications, for example). The IC chip 32 may have a receive interface connected to receiving antennas and/or a transmit interface connected to transmitting antennas. In some configurations, a receive interface and a transmit interface may be combined into a single interface.

In various embodiments, IC chip 32 includes a semiconductor substrate. In one embodiment, the semiconductor substrate includes silicon. In another embodiment, the semiconductor substrate includes silicon germanium (SiGe). In still another embodiment, the semiconductor substrate includes gallium arsenide (GaAs). Other suitable materials suitable for use as a substrate for IC chip 32 may be apparent to those of ordinary skill in the art.

The IC chip 32 may be attached to an outer surface of substrate 52 or may be included within substrate 52 as shown. Various interconnects in various layers may couple IC chip 32 to transmit antenna 45, front side receive antenna 42, and back side receive antenna 82. IC chip 32 may be included in radar package 58 using any suitable attachment method including, but not limited to wire bonding, surface mounting, adhesive, ball grid array (BGA), conductive pillars, and the like. The IC chip 32 may include additional components such as active and passive devices, metal layers, dielectric layers, doped and intrinsic semiconductor regions, redistribution layers, and other components known in the art. In various embodiments, IC chip 32 has already undergone back end of line (BEOL) processing before being attached to substrate 52.

Interconnects 79 may couple IC chip 32 to circuitry on PCB 34 using solder balls 70. In addition to providing an electrical connection between the radar package 58 and the PCB 34, solder balls 70 may also create a physical attachment of radar package 58 to PCB 34. Other attachment methods are also possible and may be apparent to those of ordinary skill in the art.

An opening 17 may be included in the PCB 34 on the front side 18 of the radar package 58. The opening 17 may allow RF signals to pass through the PCB 34. In some cases, the opening 17 may reduce attenuation and improve the gain of RF signals transmitted and received on the front side 18 of substrate 52. However, in other implementations, opening 17 may be omitted. For example, a low-loss material may be used to implement the PCB 34 and may overlap the entire front side 18 of substrate 52. In some implementations the low-loss material may act as an RF lens for antennas in radar package 58.

As a specific example, for an autofocus application of dual-sided radar, a camera located on the front side 18 of the radar system typically capture images of a user that is located relatively close to the radar system. Materials may be chosen that overlap the transmit antenna 45 and front side receive antenna 42 on the front side 18 that act as an RF waveguide to focus RF signals for close-up applications. In contrast, a camera located on the back side 19 of the radar system may typically capture images of objects located relatively far away from the radar system. The radar system may be configured to use a broad beam for the back side transmitted RF signal 20 by choosing materials of appropriate shape and composition to overlap the transmit antenna 45 and the back side receive antenna 82 on the back side 19 of the radar system.

Referring now to FIG. 2C, the radar system includes a housing 56 which encloses PCB 34 and radar package 58. The housing 56 may be an outer casing of a device such as a smartwatch, cellular device, laptop computer, IoT device, virtual reality headset, and the like. Alternatively, housing 56 may be an outer casing of a module including the radar package and additional functionality such as a radar module in a vehicle. As shown, the RF signals on the front side 18 and the back side 19 of the housing 56 pass through outer surfaces of the housing 56 to the radar package 58.

The housing 56 may advantageously be implemented using materials that are transparent or partially transparent to RF signals allowing the PCB 34 and the radar package 58 to be fully enclosed within the housing 56 while still maintaining desired functionality. In various embodiments, the housing 56 may include a plastic material. Alternatively, housing 56 may be implemented using materials that are opaque or partially opaque to RF signals and an opening may be used to allow RF signals to pass through the housing 56. The opening in the housing 56 may be uncovered exposing an outer surface of the radar package 58 and/or the PCB 34 or be covered by an RF transparent material.

Figure 3:
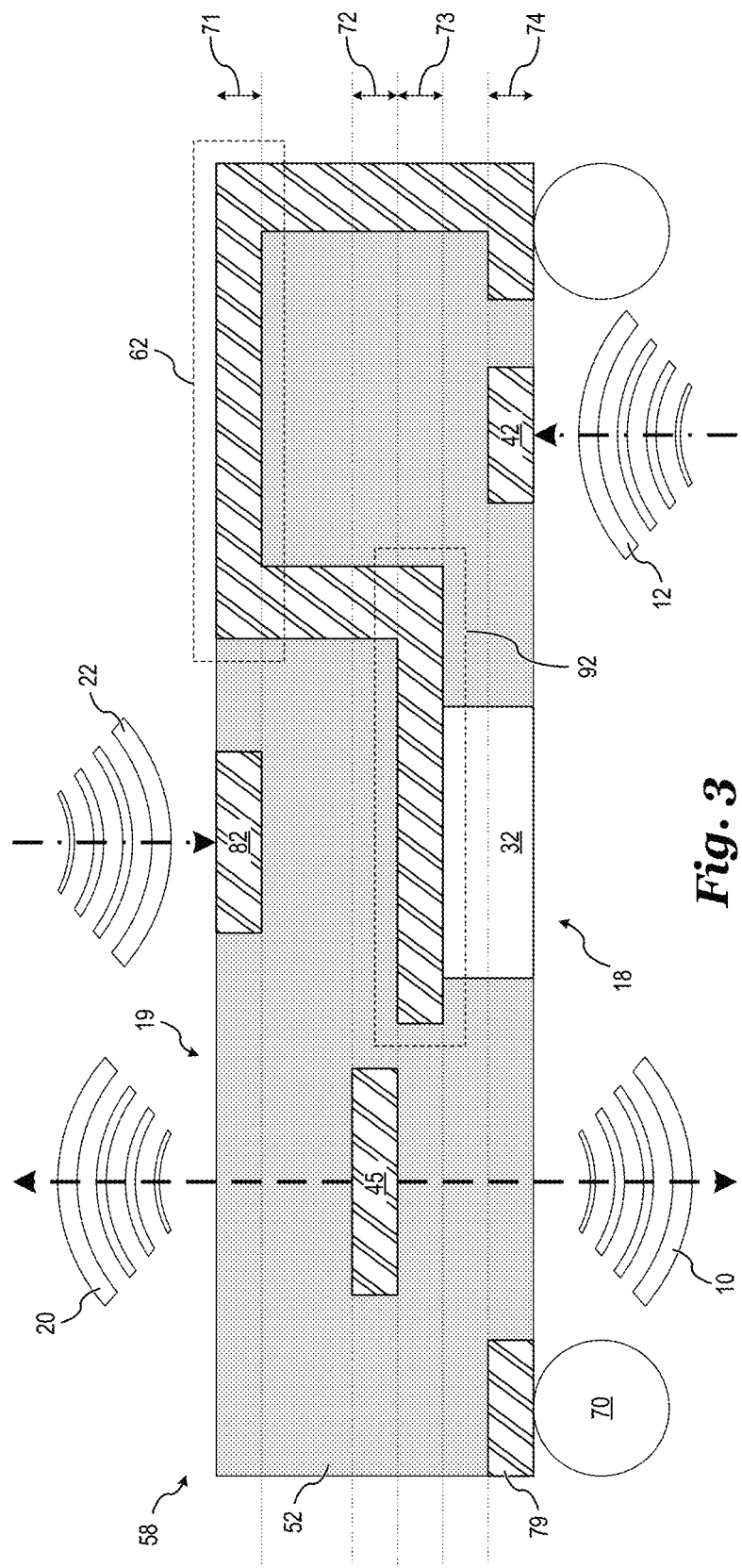
FIG. 3 illustrates a cross-sectional view of an example radar package including a transmit antenna within a substrate, a front receive antenna at a front surface of the radar package, and a back receive antenna at a back surface of the radar package in accordance with an embodiment of the invention.

FIG. 3 illustrates a cross-sectional view of an example radar package including a transmit antenna within a substrate, a front receive antenna at a front surface of the radar package, and a back receive antenna at a back surface of the radar package in accordance with an embodiment of the invention. The example radar package of FIG. 3 may be a specific implementation of the radar package as described in reference to FIG. 2 as well as in other embodiments.

Referring to FIG. 3, a radar package 58 includes a transmit antenna 45, a front side receive antenna 42, and a back side receive antenna 82 implemented using four conductive layers. Back side receive antenna 82 and a front side receiving ground plane region 62 may be implemented in a first conductive layer 71. Front side receiving ground plane 62 may act as electromagnetic shielding for front side receive antenna 42 by blocking incident RF signals originating on the back side 19 of radar package 58. For example, radar package 58 may be configured to determine the range of objects on the front side 18 of the radar package 58 by transmitting the front side transmitted RF signal 10 using transmit antenna 45 and receiving a front side reflected RF signal 12 at front side receive antenna 42. Reflected RF signals originating from objects on the back side 19 of radar package 58 may be blocked by front side receiving ground plane 62 from reaching front side receive antenna 42.

Transmit antenna 45 may be implemented in a second conductive layer 72. In one embodiment, transmit antenna 45 is implemented as an omnidirectional antenna and is configured to transmit the front side transmitted RF signal 10 and the back side transmitted RF signal 20 away from a front surface of substrate 52 located on the front side 18 of the radar package 58 and away from a back surface of substrate 52 located on the back side 19 of the radar package 58 respectively. In other embodiments, separate transmit antennas may be included in radar package 58 which only transmit RF signals away from a single side of the radar package 58.

Optionally, transmit antennas may transmit RF signals at an angle relative to surfaces of substrate 52. For example, objects on a side of radar package 58 in a particular application may consistently be located at a 30° angle relative to the normal direction of a surface on that side. Various possible directional antenna arrangements may be used to transmit RF signals on that side at a requisite angle such as multiple antennas.

A third conductive layer 73 may include a back side receiving ground plane region 92. Back side receiving ground plane region 92 may serve as an electromagnetic shield for back side receive antenna 82 in a similar manner as described for front side receiving ground plane 62. That is, RF signals originating on the front side 18 of radar package 58 may be blocked from reaching back side receive antenna 82.

In various embodiments, the second conductive layer 72 and the third conductive layer 73 may be implemented as a single conductive layer. Additionally, second conductive layer 72 and third conductive layer 73 may be considered a single conductive layer formed in two steps that include a lower conductive layer, an insulating layer, and an upper conductive layer. For example, the lower conductive layer may be formed and patterned to form transmit antenna 45 and the insulating layer may be formed over the lower conductive layer. The insulating layer may include a patternable resist which may then be patterned before the upper conductive layer is formed over insulating layer. The insulating layer may then be removed to pattern the upper conductive layer forming the back side receiving ground plane region 92.

Front side receive antenna 42 and interconnects 79 may be implemented in a fourth conductive layer 74. Interconnects 79 may include an interface for connecting to solder balls 70 such as solder pads. An additional metal layer may be included on a side of the radar package 58 to electrically couple the first conductive layer 71 to the fourth conductive layer 74, especially for grounding purposes.

Various transmission lines, interconnects, contact pads, and redistribution lines may be included in any of the conductive layers described herein. For example, a transmit antenna 45 may be fed directly using a transmission line in the second conductive layer 72 which is coupled to IC chip 32 using interconnects. Alternatively, transmit antenna 45 may be fed indirectly from a transmission line in another layer such as third conductive layer 73. Similar transmission lines and interconnects may exist to couple front side receive antenna 42 and back side receive antenna 82 to IC chip 32.

The conductive layers described herein include a conductive material and may include a metal in various embodiments. For example, each conductive layer may include one or more of copper (Cu), silver (Ag), gold (Au), aluminum (Al), tungsten (W), platinum (Pt), and palladium (Pd), for example. In some applications, conductive layers may include other conductive materials such as graphene, conductive ceramics, polysilicon, and others. Other suitable conductive materials may also be apparent to those of ordinary skill in the art.

Figure 4:
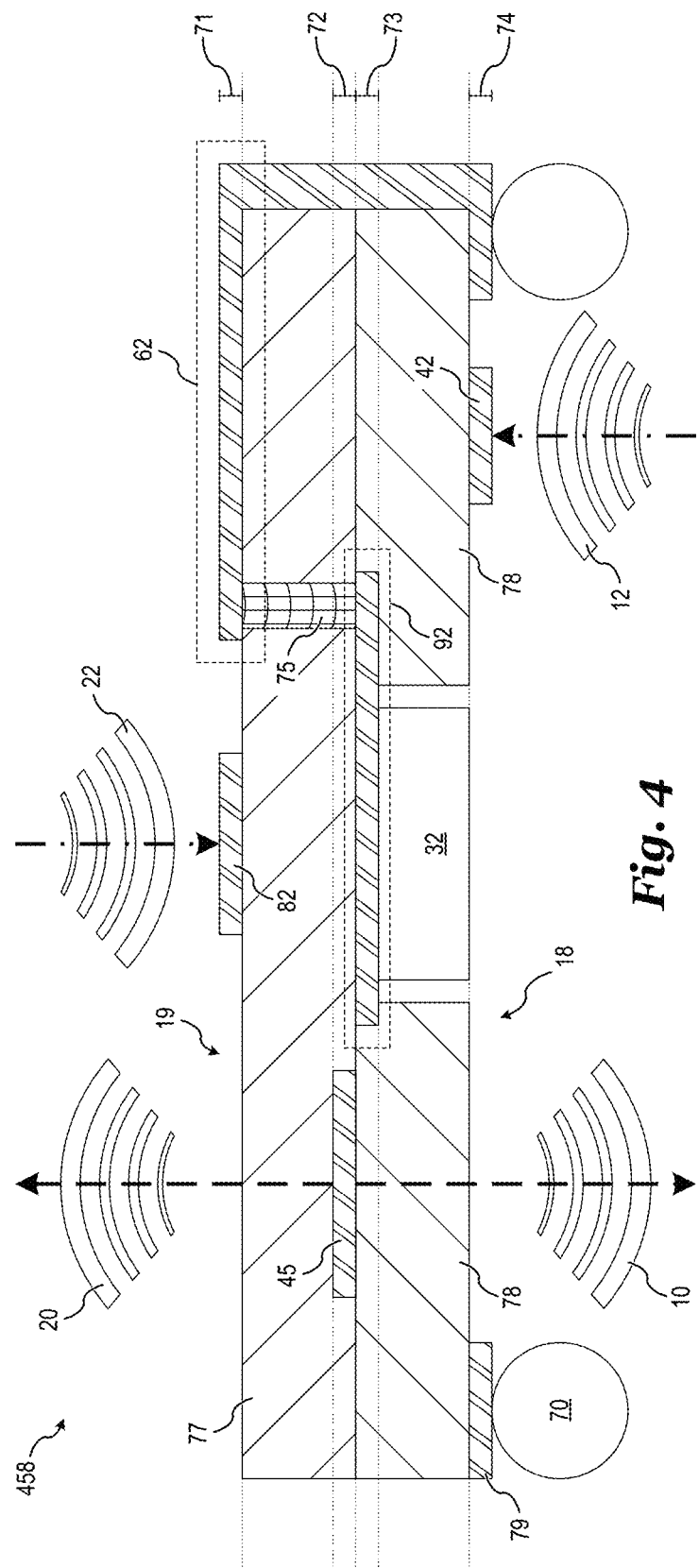
FIG. 4 illustrates an example laminate radar package including a transmit antenna between two laminate layers, a front receive antenna at a front surface of the radar package, and a back receive antenna at a back surface of the radar package in accordance with an embodiment of the invention.

FIG. 4 illustrates an example laminate radar package including a transmit antenna between two laminate layers, a front receive antenna at a front surface of the radar package, and a back receive antenna at a back surface of the radar package in accordance with an embodiment of the invention.

Referring to FIG. 4, an example laminate radar package 458 is shown which includes a transmit antenna 45, a front side receive antenna 42 and corresponding front side receiving ground plane region 62, and a back side receive antenna 82 and corresponding back side receiving ground plane region 92. The antennas and ground plane regions are implemented using a first laminate layer 77, a second laminate layer 78, and four conductive layers 71, 72, 73, and 74. The laminate radar package 458 may be a specific implementation of radar package 58 as previously described in reference to FIGS. 2A-2C and 3. All similarly labeled elements may share common features as described in previous and subsequent embodiments in addition to having various differences as described in reference to FIG. 4.

Laminate radar package 458 is implemented using multiple conductive layers and laminate layers. The conductive layers may be patterned to form ground planes, redistributions lines, transmission lines, planar antennas, contact pads, and the like. In some embodiments, the conductive layers may be formed from a metal foil, metal layer, or metallization that has been laminated to a laminate layer. In one embodiment, the conductive layers comprise copper (Cu). In some embodiments, the conductive layers comprise other conductive materials such as silver (Ag) and aluminum (Al). In some embodiments, the conductive layers may comprise different conductive materials.

The laminate layers may separate the conductive layers and provide structural support for laminate radar package 458. In various embodiments, the laminate layers comprise a low-loss high frequency material such as a woven glass reinforced hydrocarbon ceramic and/or polytetrafluoroethylene (PTFE). In some embodiments, the laminate layers comprise a pre-impregnated composite material (PPG). One or more of the laminate layers may be commercial laminate material manufactured with copper cladding on one or both surfaces.

One type of laminate material that may be used to form the conductive layers and laminate layers in laminate radar package 458 is copper clad laminate. Sheets of copper clad laminate material may be fabricated as single-sided or double-sided copper clad sheets. During the fabrication process, copper sheets may be placed on one or both sides of the laminate material. Some combination of heat and pressure may then be applied to facilitate attachment of the copper sheets to the laminate material.

A conductive layer on a surface of a laminate layer may be an electrodeposited (ED) foil or a rolled foil, for example. A rolled foil sheet may be produced by repeatedly feeding the foil sheet through rollers to evenly reduce the thickness of the foil sheet. ED foil may be more rigid and have a different grain structure. In contrast, rolled foil may be smooth and flexible. In some cases, rolled foil may be advantageous in RF applications, due to decreased surface roughness.

One or more vias 75 connect the first conductive layer 71 and the third conductive layer 73. For example, prior to attaching the second laminate layer 78 to the first laminate layer 77, one or more vias 75 may be formed as through substrate vias (TSVs) passing through the first laminate layer 77 from the first conductive layer 71 on a back side 19 surface of the first laminate layer 77 to an opposing surface of the first laminate layer 77. The one or more vias 75 may be exposed at the opposing surface such that electrical contact is made with third conductive layer 73 upon attachment of second laminate layer 78 to first laminate layer 77. Alternatively, the one more vias 75 may be implemented as blind vias after second laminate layer 78 is attached to first laminate layer 77 electrically connecting first conductive layer 71 to third conductive layer 73.

In various embodiments, the one or more vias 75 may provide electrical coupling between front side receiving ground plane region 62 and back side receiving ground plane region 92. In this way front side receiving ground plane region 62 and back side receiving ground plane region 92 may be coupled to a ground or reference potential in order to provide electromagnetic shielding of respective sides of front side receive antenna 42 and back side receive antenna 82. Additional vias may be included to electrically couple other conductive layers and components as necessary for specific functionality in various applications.

Figure 5:
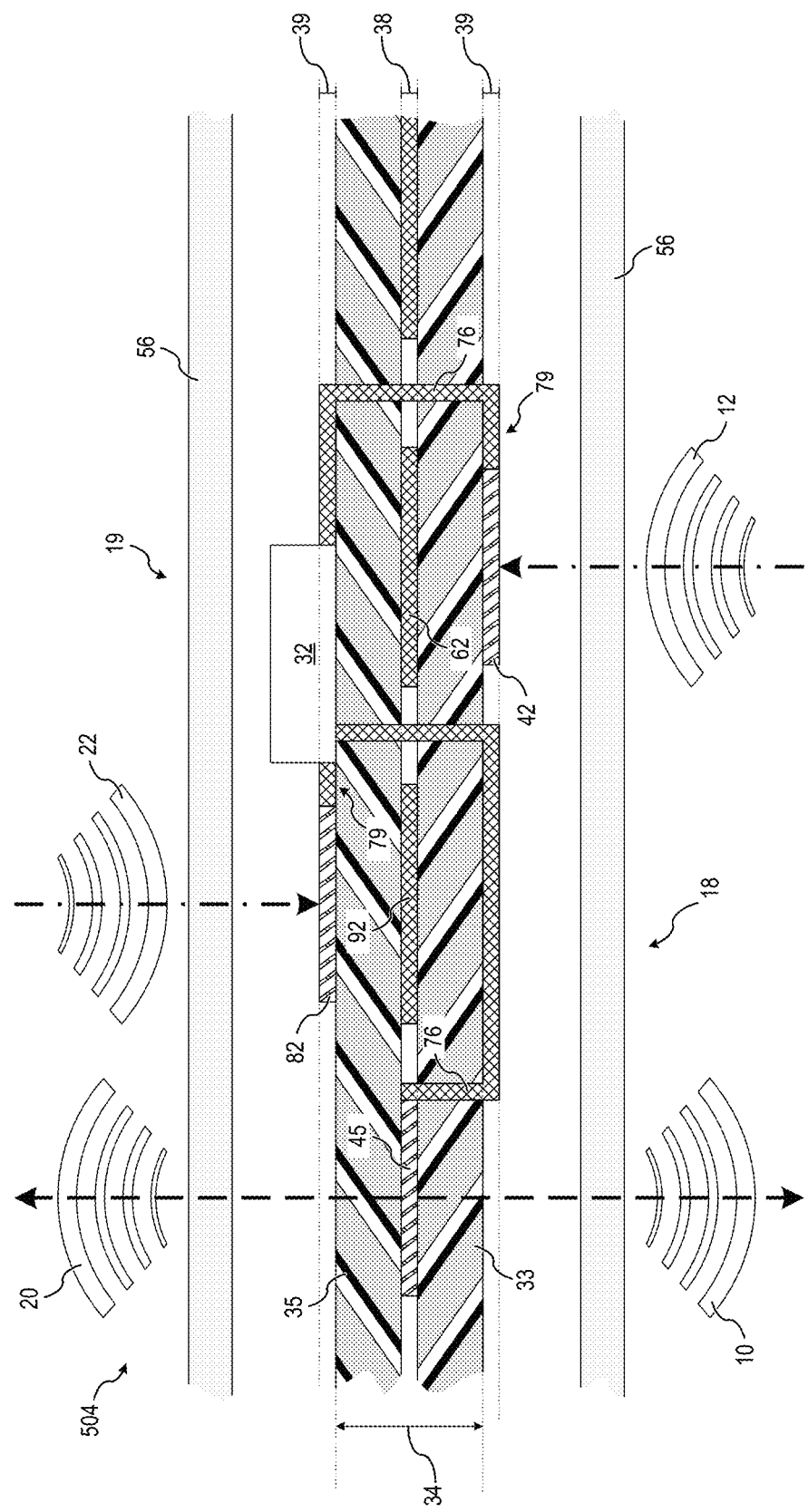
FIG. 5 illustrates an example radar system including a housing enclosing a transmit antenna, a front receive antenna, and a back receive antenna attached to a multi-player printed circuit board in accordance with an embodiment of the invention.

FIG. 5 illustrates an example radar system including a housing enclosing a transmit antenna, a front receive antenna, and a back receive antenna attached to a multiplayer printed circuit board in accordance with an embodiment of the invention. The example radar system of FIG. 5 may be alternative implementation of the radar system as described in reference to FIG. 2 and may be applied to the embodiment of FIG. 2 as well as to other embodiments.

Referring to FIG. 5, a radar system 504 includes a transmit antenna 45, a front side receive antenna 42 and corresponding front side receiving ground plane region 62, and a back side receive antenna 82 and corresponding back side receiving ground plane region 92. The antennas and ground plane regions are implemented using a front PCB 51 and a back PCB 53. The combination of front PCB 51 and back PCB 53 may be a specific multilayer PCB implementation of PCB 34 as described in other embodiments. However, in contrast to other embodiments which utilize a radar package attached to a PCB, in radar system 504 the antennas, ground plane regions, and IC chip 32 may be directly attached to front PCB 51 and back PCB 53 as part of a PCB 34.

In this configuration, a common ground layer 38 disposed between front PCB 51 and back PCB 53 may be used to implement both front side receiving ground plane region 62 and back side receiving ground plane region 92 as well as transmit antenna 45. Through-hole vias 76 may then provide electrical coupling to a front side conductive layer 37 and a back side conductive layer 39. One or more front side receive antennas 42 may be implemented in front side conductive layer 37 while one or more back side receive antennas 82 may be implemented in back side conductive layer 39.

The PCB 34 may be disposed in a housing 56 which may be as previously described in reference to FIG. 2B. RF signals may pass through outer surfaces of the housing 56 including front and back side transmitted RF signals 10 and 20, and front and back side reflected RF signals 12 and 22.

Figure 6A:
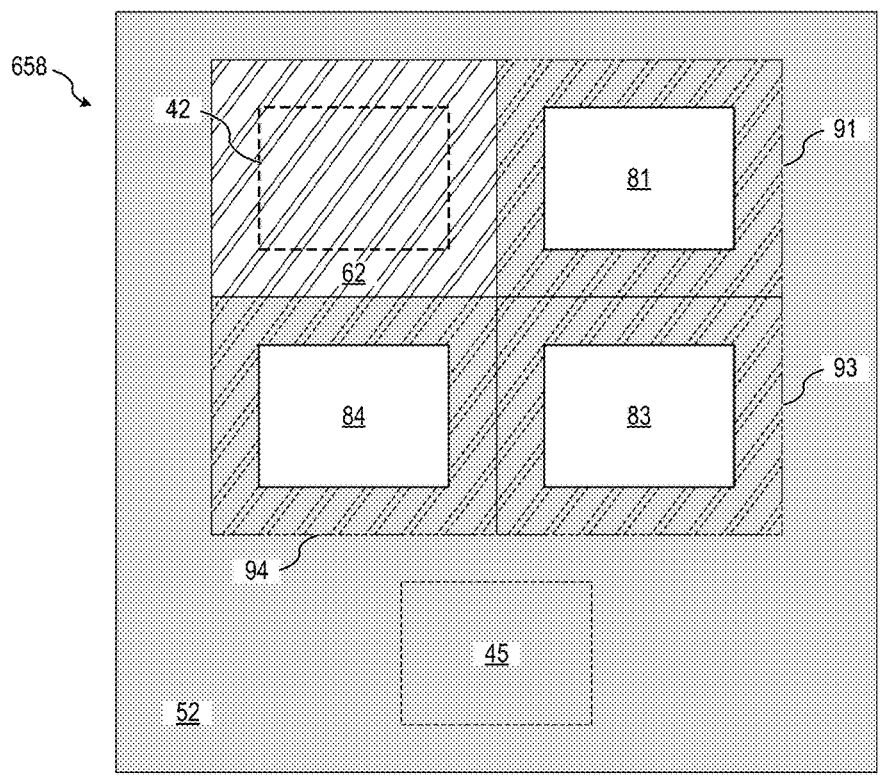
FIGS. 6A and 6B illustrate an example radar package including a transmit antenna, a front receive antenna, and three back receive antennas in accordance with an embodiment of the invention where
Figure 6B:
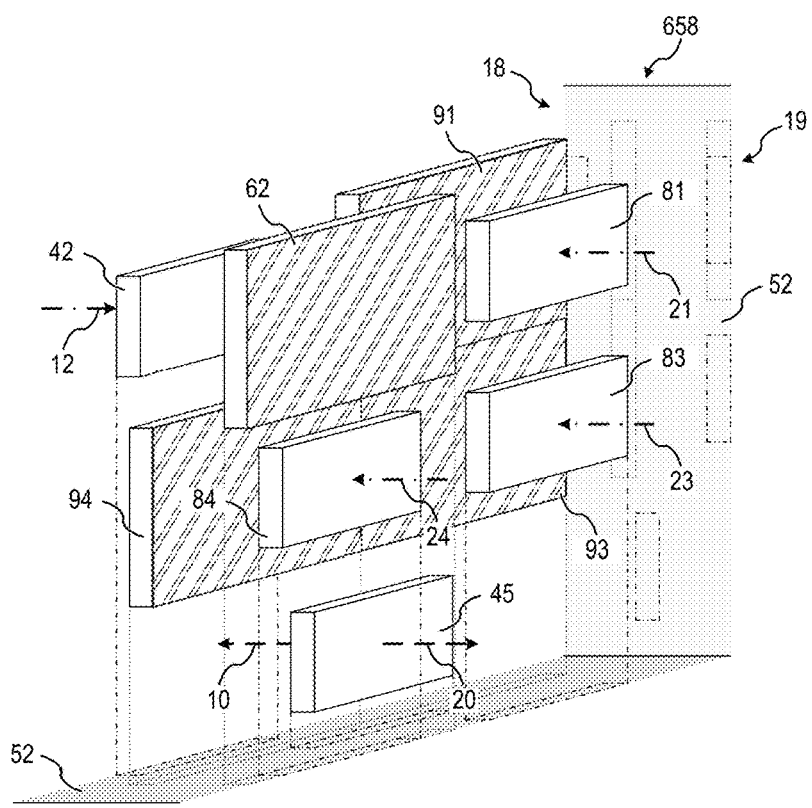

FIGS. 6A and 6B illustrate an example radar package including a transmit antenna, a front receive antenna, and three back receive antennas in accordance with an embodiment of the invention where FIG. 6A illustrates a top view of the radar package and FIG. 6B illustrates a three-dimensional view of the relative locations of antennas and ground planes within the radar package. The example radar package illustrated in FIGS. 6A and 6B may be a specific implementation of other example radar packages as described in previous embodiments such as in reference to FIGS. 2A-2C and 3-5, for example.

Referring to FIGS. 6A and 6B, a top view and a three-dimensional view of a radar package 658 is shown which includes a transmit antenna 45 disposed within a substrate 52 and configured to transmit a front side transmitted RF signal 10 and a back side transmitted RF signal 20. In this embodiment, transmit antenna 45 is implemented as an omnidirectional antenna, but other configurations are possible. The radar package 658 further includes a front side receive antenna 42 and a corresponding front side receiving ground plane region 62 attached to substrate 52. Front side receive antenna 42 is configured to receive front side reflected RF signal 12 which may be generated when front side transmitted RF signal 10 reflects off an object located at a distance on a front side 18 of radar package 658.

Radar package 658 also includes a first back side receive antenna 81, a second back side receive antenna 83, and a third back side receive antenna 84. RF signals originating from the front side 18 of radar package 658 may be blocked from reaching the back side receive antennas using a first back side receiving ground plane region 91, a second back side receiving ground plane region 93, and a third back side receiving ground plane region 94.

The back side receive antennas are configured to receive corresponding reflected RF signals including a first back side reflected RF signal 21, a second back side reflected RF signal 23, and a third back side reflected RF signal 24. These back side reflected RF signals may be generated when back side transmitted RF signal 20 reflects off an object located at a distance on a back side 19 of radar package 658. Each back side reflected RF signal may have different properties as determined by radio frequency circuitry coupled to the back side receive antennas. For example, comparison of phase information included in the back side reflected RF signals may allow radar package 658 to track movement of an object located at a distance on the back side of radar package 658 and moving in a direction parallel to a back side surface of substrate 52.

As an example, a single receive antenna configuration may be used to track movement of an object in a direction that is perpendicular to a surface of the substrate. As a second example, a configuration of two receive antennas arranged in a row may be used to track movement of an object in both the direction perpendicular to the surface of the substrate and a direction parallel to the surface of the substrate and the row of two receive antennas. Such a configuration may allow the radar package to track two dimensional movement of an object.

As a third example, a configuration of three receive antennas arranged in a row of two antennas and a column of two antennas may be used to track movement of an object in the direction perpendicular to the surface of the substrate, the direction parallel to both the surface of the substrate and the row of two receive antennas, and in a direction parallel to both the surface of the substrate and the column of two receive antennas. Such as configuration may allow the radar package to track three dimensional movement of an object. In this way, the first back side receive antenna 81, the second back side receive antenna 83, and the third back side receive antenna 84 of radar package 658 may be used to track three dimensional movement of an object located at a distance on the back side 19 of the radar package 658.

Figure 7A:
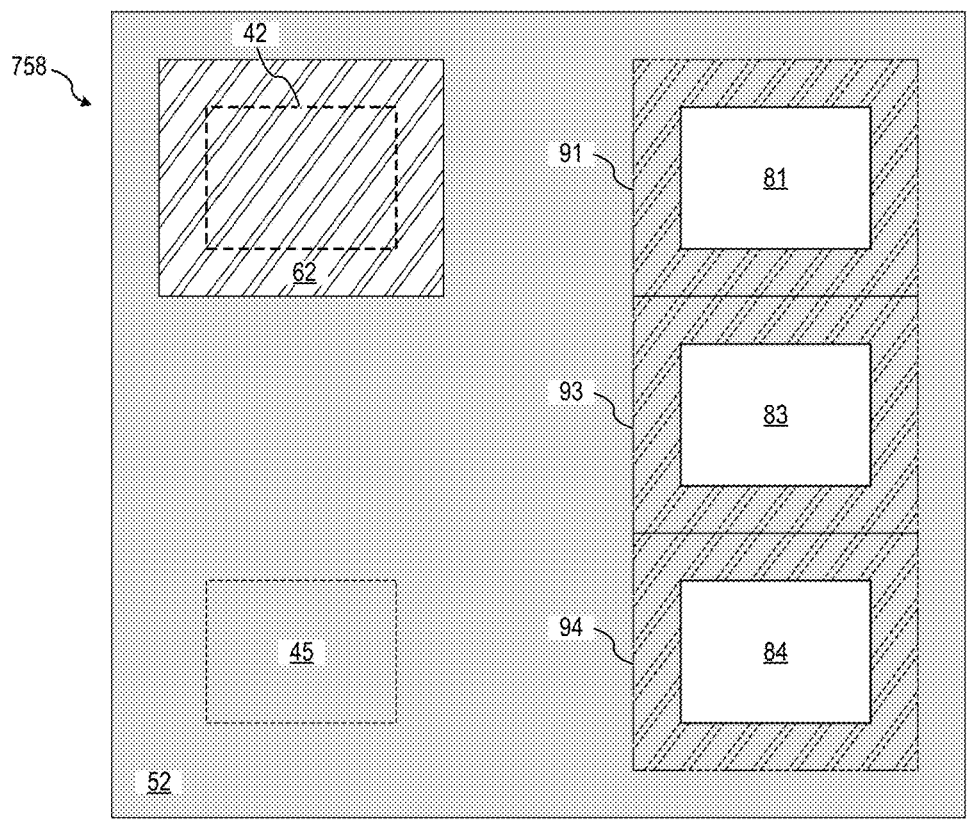
FIGS. 7A and 7B illustrate another example radar package including a transmit antenna, a front receive antenna, and three back receive antennas in accordance with an embodiment of the invention where
Figure 7B:
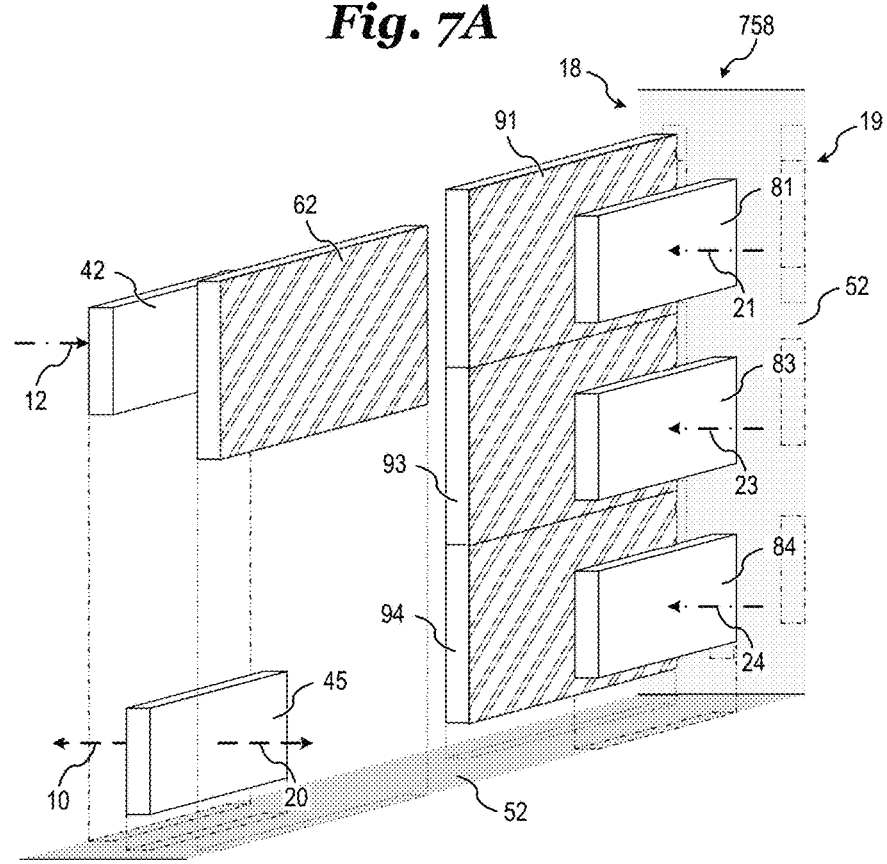

FIGS. 7A and 7B illustrate another example radar package including a transmit antenna, a front receive antenna, and three back receive antennas in accordance with an embodiment of the invention where FIG. 7A illustrates a top view of the radar package and FIG. 7B illustrates a three-dimensional view of the relative locations of antennas and ground planes within the radar package. The example radar package illustrated in FIGS. 7A and 7B may be a specific implementation of other example radar packages as described in previous embodiments such as in reference to FIGS. 2A-2C and 3-5, for example.

Referring to FIGS. 7A and 7B, a top view and a three-dimensional view of a radar package 758 is shown which includes a transmit antenna 45 disposed within a substrate 52 and configured to transmit a front side transmitted RF signal 10 and a back side transmitted RF signal 20. Similar to radar package 658, radar package 758 includes one front side receive antenna and three back side receive antennas. Radar package 758 differs from previous embodiments, in that the first back side receive antenna 81, the second back side receive antenna 83, and the third back side receive antenna 84 are arranged in a single column rather than the right angle configuration of radar package 658.

In some implementations, including additional receive antennas in a row or column may increase the accuracy of tracked object movement along a direction parallel to the row or column. For example, in the single column configuration of radar package 758, three receive antennas may be used to track movement of an object in a direction perpendicular to a back side 19 surface of a substrate 52 as well as in a direction parallel to both the back side 19 surface and the column of three receive antennas. The resolution of the tracked movement may be improved by the inclusion of three receive antennas rather than two receive antennas as previously described. Additional receive antennas may be included as part of the column to further increase resolution. In various embodiments, a row of receive antennas may also be included to enable three-dimensional movement tracking.

Figure 8A:
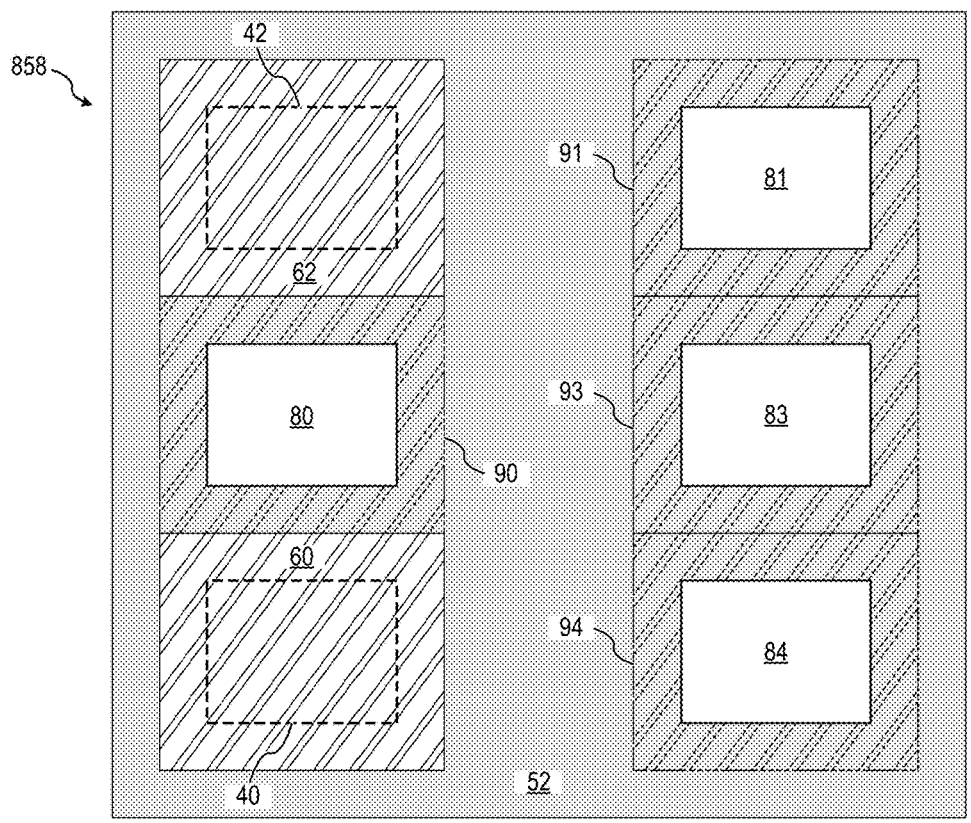
FIGS. 8A and 8B illustrate an example radar package including front transmit and receive antennas, a back transmit antenna, and three back receive antennas in accordance with an embodiment of the invention where
Figure 8B:
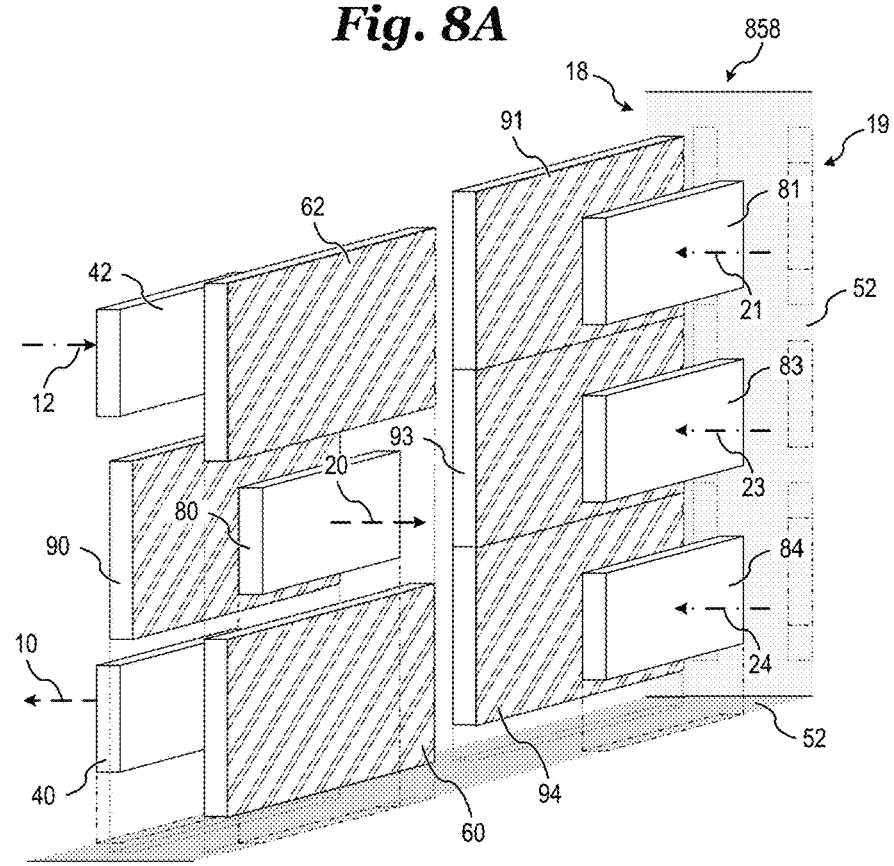

FIGS. 8A and 8B illustrate an example radar package including front transmit and receive antennas, a back transmit antenna, and three back receive antennas in accordance with an embodiment of the invention where FIG. 8A illustrates a top view of the radar package and FIG. 8B illustrates a three-dimensional view of the relative locations of antennas and ground planes within the radar package. The example radar package illustrated in FIGS. 8A and 8B may be a specific implementation of other example radar packages as described in previous embodiments such as in reference to FIGS. 2A-2C and 3-5, for example.

Referring to FIGS. 8A and 8B, a top view and a three-dimensional view of a radar package 858 is shown which includes a front side transmit antenna 40 and a corresponding front side transmit ground plane region 60 and a back side transmit antenna 80 with a corresponding back side transmit ground plane region 90. Radar package 858 is similar to previously described radar packages except for the inclusion of a separate transmit antenna for each transmit direction. For example, front side transmit ground plane region 60 may block transmitted RF signals from propagating to the back side 19 of radar package 858. Similarly, back side transmit ground plane region 90 may block transmitted RF signals from propagation to the front side 18 of radar package 858.

As illustrated, the configuration of receive antennas in radar package 858 is similar to radar package 758. The combination of front side transmit antenna 40 and back side transmit antenna 80 may function in a similar manner to transmit antenna 45 of other embodiments. The separation of front side transmit antenna 40 and back side transmit antenna 80 may advantageously enable flexibility in the parameters of front side transmitted RF signal 10 and back side transmitted RF signal 20. For example, frequency, intensity, and transmit timing and duration may all be adjusted independently for front side transmitted RF signal 10 and back side transmitted RF signal 20.

It should be noted that although the configuration of radar package 858 for back side object detection is three receive antennas arranged in a single column as in radar package 758, a right angle configuration as in radar package 658 is also possible with a two directional transmit antenna configuration. For example, the locations of back side transmit antenna 80 and the third back side receive antenna 84 could be switched in radar package 858. Radar package 858 is illustrated and described as an example of a radar package using separate front side and back side transmit antennas. Other radar packages described herein as well as other configurations not described explicitly may also be implemented using a front side transmit antenna and a back side transmit antenna. Such additional configurations may be apparent to those of ordinary skill in the art.

Figure 9A:
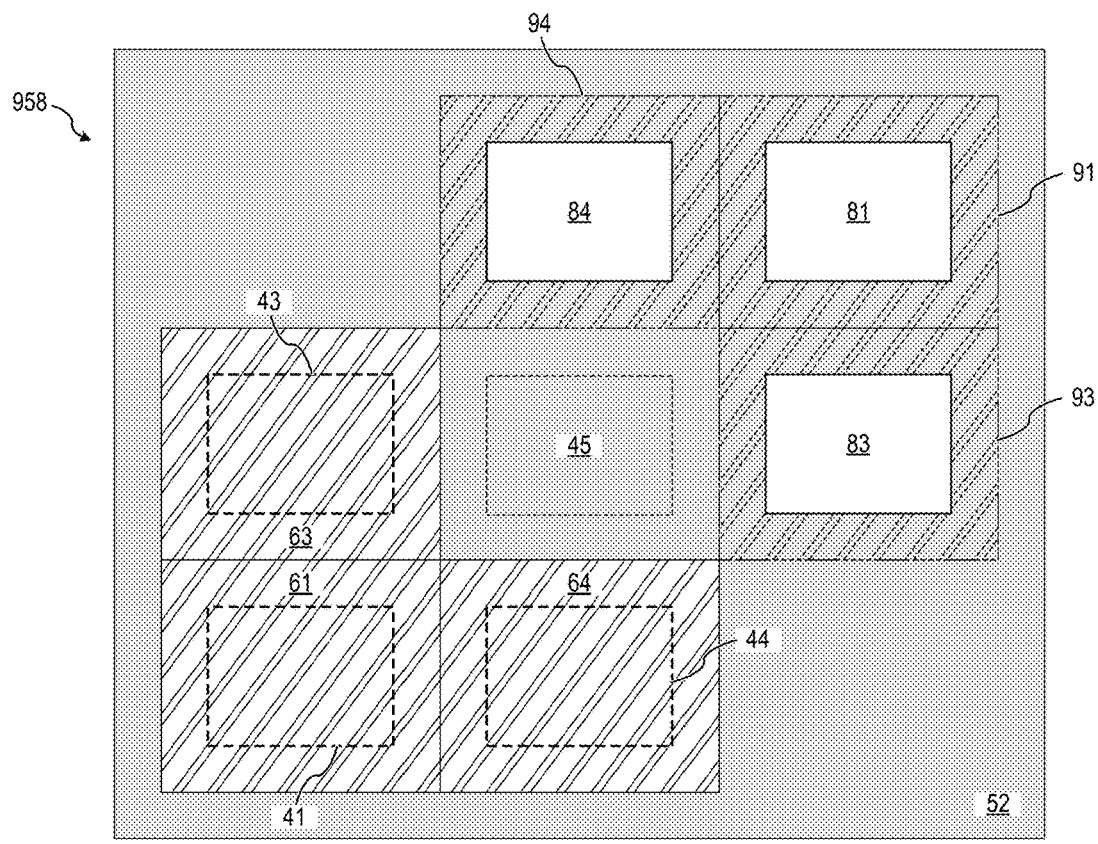
FIGS. 9A and 9B illustrate an example radar package including a transmit antenna, three front receive antennas, and three back receive antennas in accordance with an embodiment of the invention where
Figure 9B:
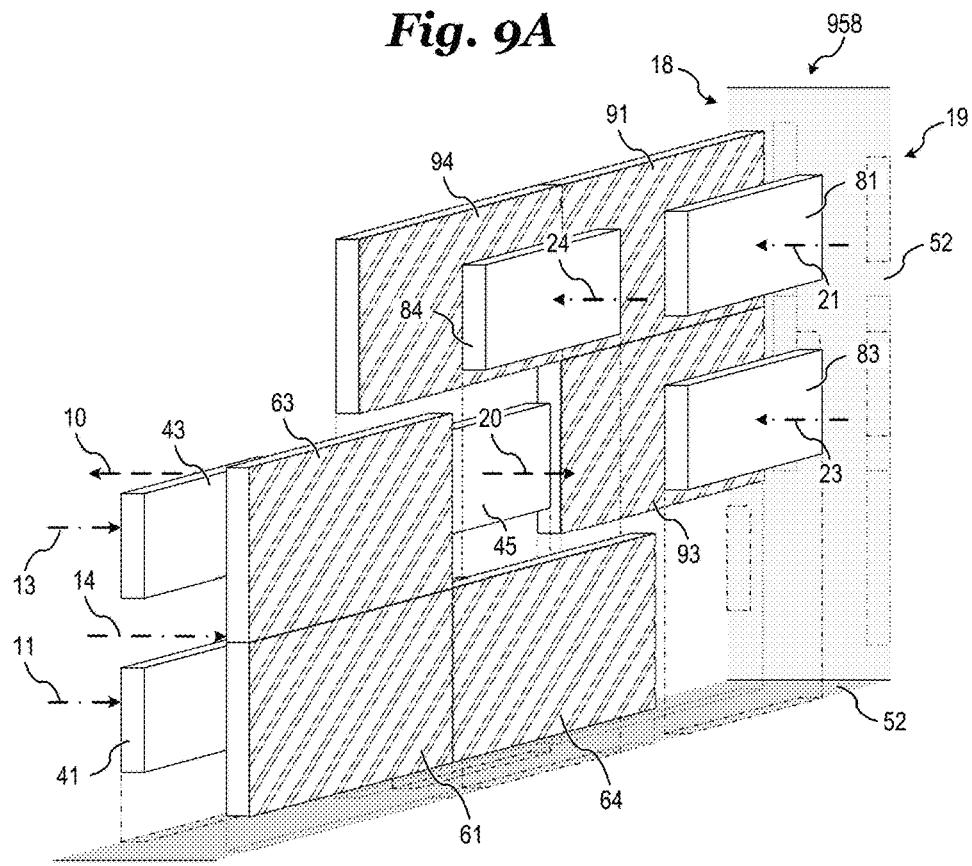

FIGS. 9A and 9B illustrate an example radar package including a transmit antenna, three front receive antennas, and three back receive antennas in accordance with an embodiment of the invention where FIG. 9A illustrates a top view of the radar package and FIG. 9B illustrates a three-dimensional view of the relative locations of antennas and ground planes within the radar package. The example radar package illustrated in FIGS. 9A and 9B may be a specific implementation of other example radar packages as described in previous embodiments such as in reference to FIGS. 2A-2C and 3-5, for example.

Referring to FIGS. 9A and 9B, a top view and a three-dimensional view of a radar package 958 is shown which includes three front side receive antennas and three back side receive antennas with corresponding receive ground plane regions. Specifically, radar package 958 includes a first front side receive antenna 41 and a first front side receive ground plane region 61, a second front side receive antenna 43 and a second front side receive ground plane region 63, and a third front side receive antenna 44 and a third front side receive ground plane region 64 in addition to a right angle back side receive antenna configuration. The back side receive antenna configuration of radar package 958 is similar to radar package 658.

In the configuration of radar package 958, a transmit antenna 45 is configured to transmit RF signals on a front side 18 and a back side 19 of a substrate 52. Objects located at a distance on the front side 18 and the back side 19 may generate respective reflected signals which are received by the front side receive antennas and the back side receive antennas. Specifically, first front side receive antenna 41, second front side receive antenna 43, and third front side receive antenna 44 may be configured to receive a first front side reflected RF signal 11, a second front side reflected RF signal 13, and a third front side reflected RF signal 14 respectively. In this configuration, radar package 958 may be configured to track three-dimensional movement of objects located on both the front side 18 and the back side 19 of the radar package 958.

Figure 10A:
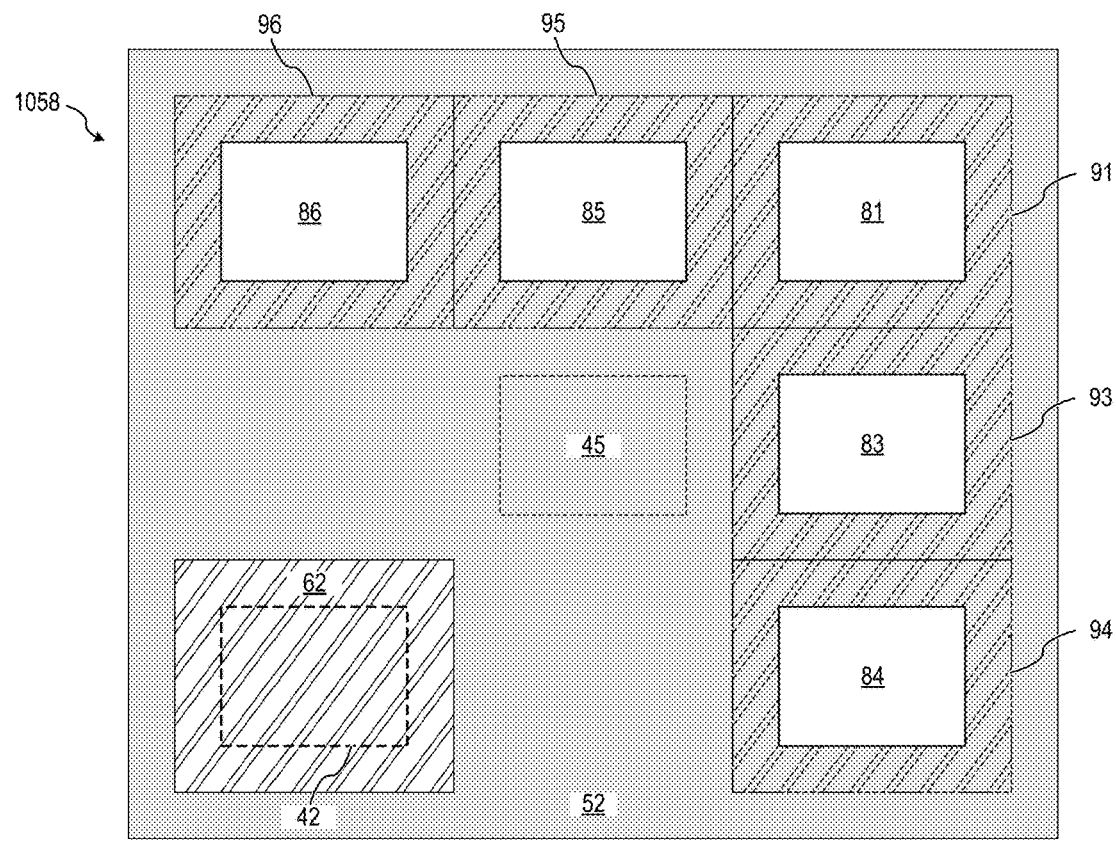
FIGS. 10A and 10B illustrate an example radar package including a transmit antenna, a front receive antenna, and five back receive antennas in accordance with an embodiment of the invention where
Figure 10B:
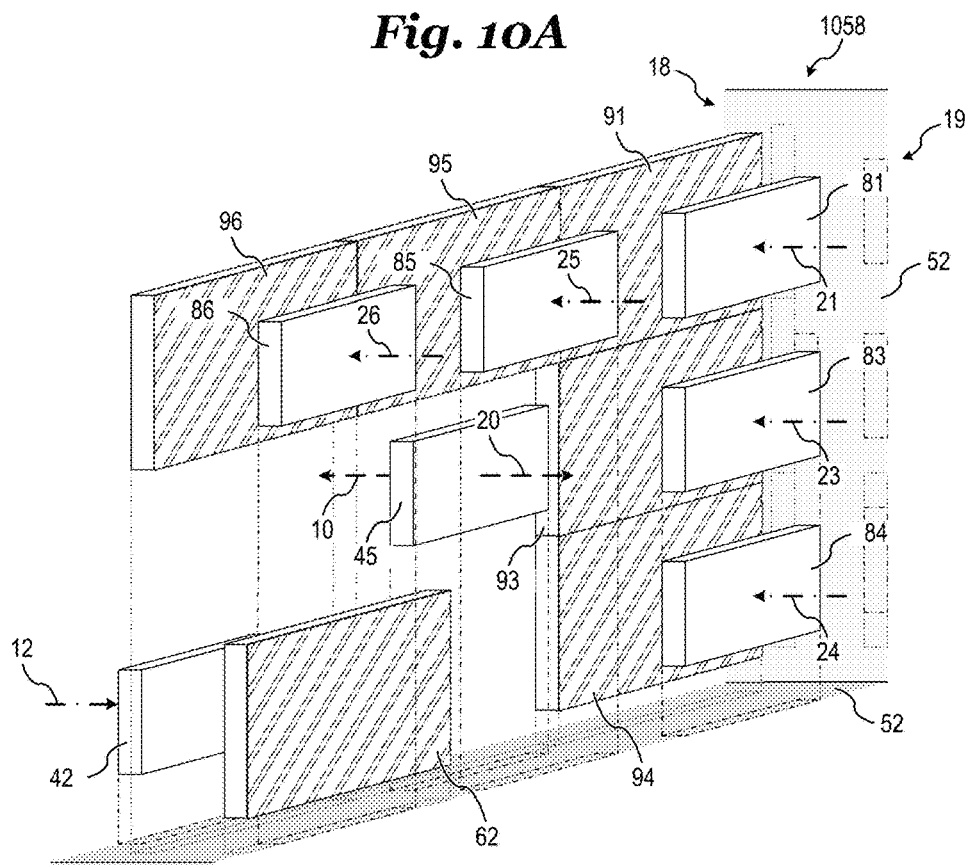

FIGS. 10A and 10B illustrate an example radar package including a transmit antenna, a front receive antenna, and five back receive antennas in accordance with an embodiment of the invention where FIG. 10A illustrates a top view of the radar package and FIG. 10B illustrates a three-dimensional view of the relative locations of antennas and ground planes within the radar package. The example radar package illustrated in FIGS. 10A and 10B may be a specific implementation of other example radar packages as described in previous embodiments such as in reference to FIGS. 2A-2C and 3-5, for example.

Referring to FIGS. 10A and 10B, a top view and a three-dimensional view of a radar package 1058 is shown which includes a front side receive antenna and five back side receive antennas with corresponding receive ground plane regions. Radar package 1058 has a similar configuration as radar package 658 except that two additional back side receive antennas are included. Specifically, radar package 1058 includes a fourth back side receive antenna 85 with a corresponding fourth back side receive ground plane region 95 and a fifth back side receive antenna 86 with a corresponding fifth back side receive ground plane region 96 which are configured to receive fourth back side reflected RF signal 25 and fifth back side reflected RF signal 26 respectively.

In the configuration of radar package 1058, the resolution of both the vertical and horizontal components parallel to a back side 19 surface of substrate 52 may be improved by including fourth back side receive antenna 85 and fifth back side receive antenna 86. Similar to previous embodiments, the configuration illustrated in Figure to may include more antennas or fewer antennas depending on desired functionality for specific applications.

Figure 11A:
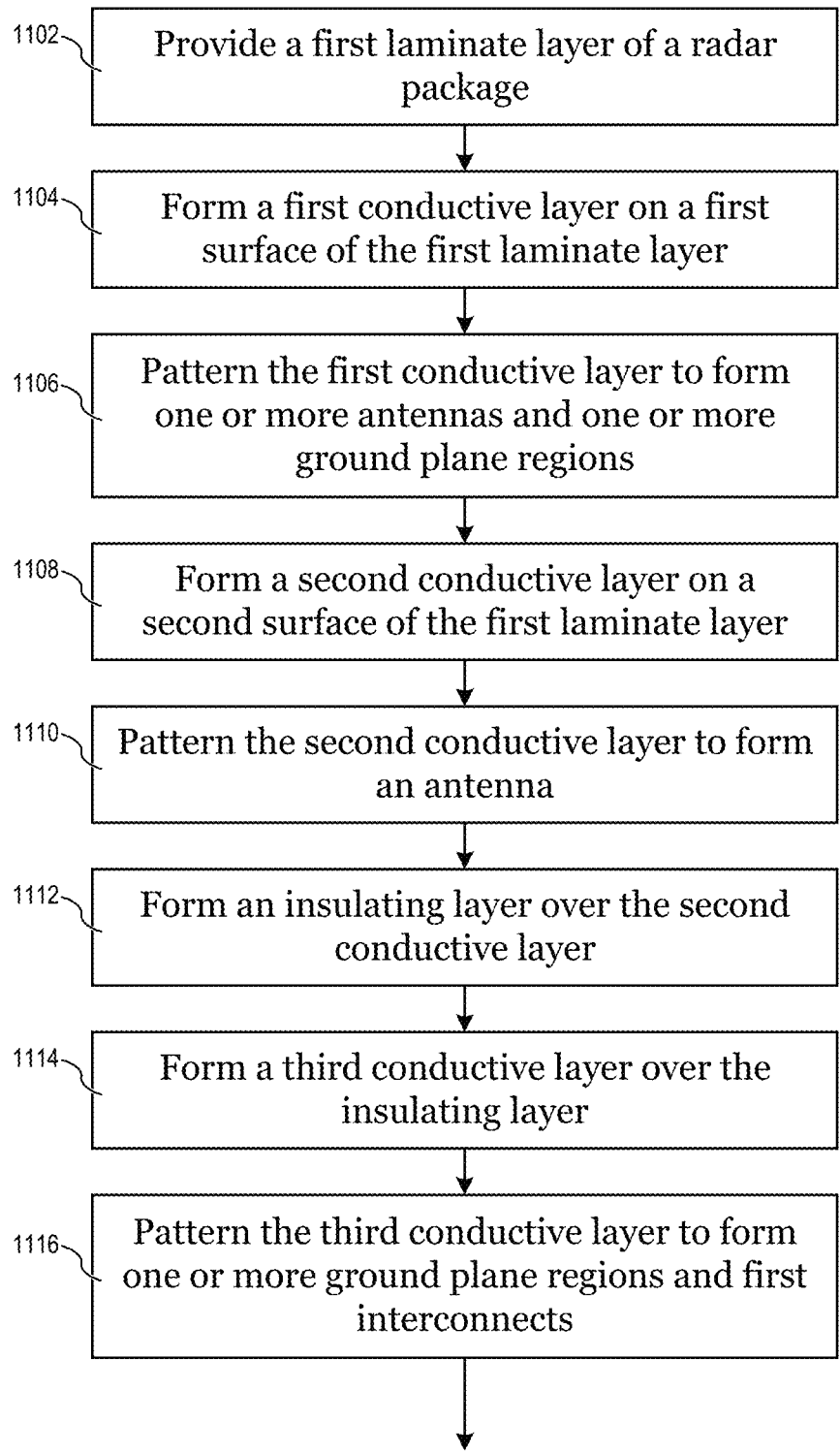
FIGS. 11A and 11B illustrate a method of forming a radar system in accordance with an embodiment of the invention where
Figure 11B:
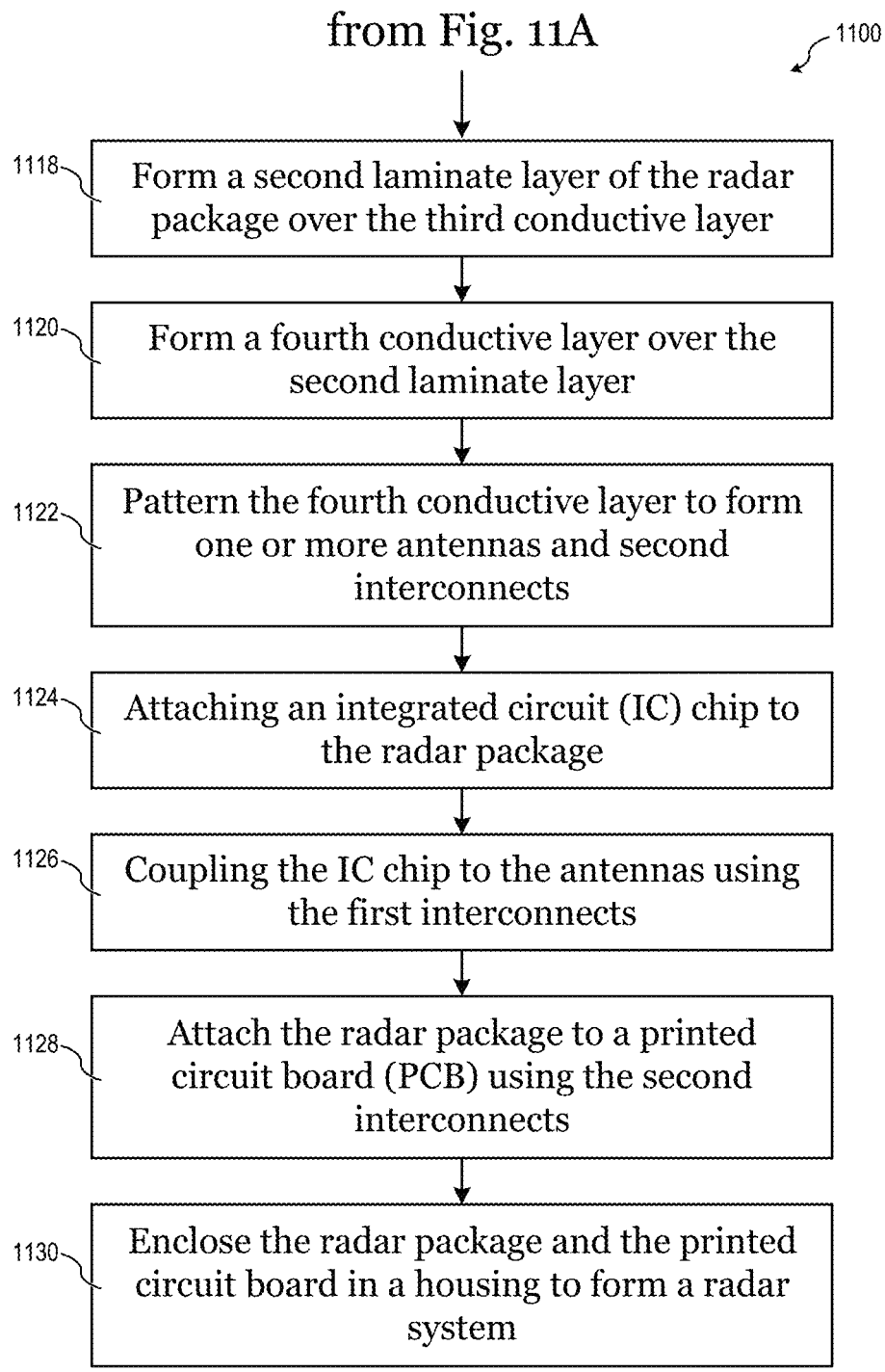

FIGS. 11A and 11B illustrate a method of forming a radar system in accordance with an embodiment of the invention where FIG. 11A illustrates steps 1102 through 1116 and FIG. 11B illustrates steps 1118 through 1130.

Referring to FIG. 11A, the method 1100 of forming the radar system includes a step 1102 of forming the radar system includes providing a first laminate layer of a radar package. The first laminate layer may comprise a laminate material and may be a PCB in various embodiments. The method 1100 further includes a step 1104 of forming a first conductive layer on a first surface of the first laminate layer. Alternatively, the first conductive layer may already be present on the first surface of the first laminate layer and step 1104 may be omitted. After forming the first conductive layer, method 1100 includes a step 1106 of patterning the first conductive layer to form one or more antennas and one or more ground plane regions. The one or more antennas and one or more ground lane regions may be antennas and ground plane regions on a back side of a radar package as described in previous embodiments.

The method 1100 further includes a step 1108 of forming a second conductive layer on a second surface of the first laminate layer. The second surface may be an opposing surface relative to the first surface. As with the first conductive layer, the second conductive layer may already be present on the second surface of the first laminate layer and step 1108 may be omitted. After forming the second conductive layer, the method 1100 also includes a step 1110 of patterning the second conductive layer to form an antenna. The antenna patterned from the second conductive layer may a transmit antenna as described in previous embodiments. In some embodiments, additional antennas may be patterned in the second conductive layer as well as other components.

Still referring to FIG. 11A, the method 1100 also includes a step 1112 of forming an insulating layer over the second conductive layer. The insulating layer may prevent a subsequently formed third conductive layer from making electrical contact with the second conductive layer. After the insulating layer is formed, the method 1100 includes a step 1114 of forming a third conductive layer over the insulating layer and a step 1116 of patterning the third conductive layer to form one or more ground plane regions and first interconnects. The one or more ground plane regions may correspond to subsequently formed antennas as described in previous embodiments.

Now referring to FIG. 11B, the method 1100 includes a step 1118 of forming a second laminate layer of the radar package over the third conductive layer and a step 1120 of forming a fourth conductive layer over the second laminate layer. As with previous steps, the fourth conductive layer may optionally already be present on the second laminate layer and step 1120 may be omitted. The method 1100 further includes a step 1122 of patterning the fourth conductive layer to form one or more antennas and second interconnects.

The method 1100 also includes a step 1124 of attaching an IC chip to the radar package. The IC chip may be an RFIC chip in various embodiments. Step 1124 may be performed at any suitable time during the process of forming the radar package. For example, in some embodiments, the RFIC chip may be coupled to the second interconnects in the fourth conductive layer and may be attached after step 1122. In other embodiments, the IC chip may be enclosed within the second laminate layer and may be coupled to the first interconnects in the third conductive layer and may be attached prior to step 1120. Alternatively, the IC chip may be attached at a different time or to different conductive layers and may also be attached to a separate substrate in the radar system in some embodiments.

Still referring to FIG. 11B, the method 1100 includes a step 1126 of coupling the IC chip to the antennas using the first interconnects. Optionally, the IC chip may use interconnects in a different conductive layer to connect to the antennas. Additionally, step 1126 may also be performed at the same time as step 1124 where the same connections may function as both physical and electrical connections.

After the radar package has been formed, the method 1100 further includes a step 1126 of attaching the radar package to a PCB using the second interconnects. The radar package may be attached to the PCB as in previous embodiments, such as in reference to FIG. 2, for example. After the radar package has been attached to the PCB, method 1100 may include a step 1130 of enclosing the radar package and the PCB in a housing to form a radar system. The housing may also be as previously described.

Figure 12:
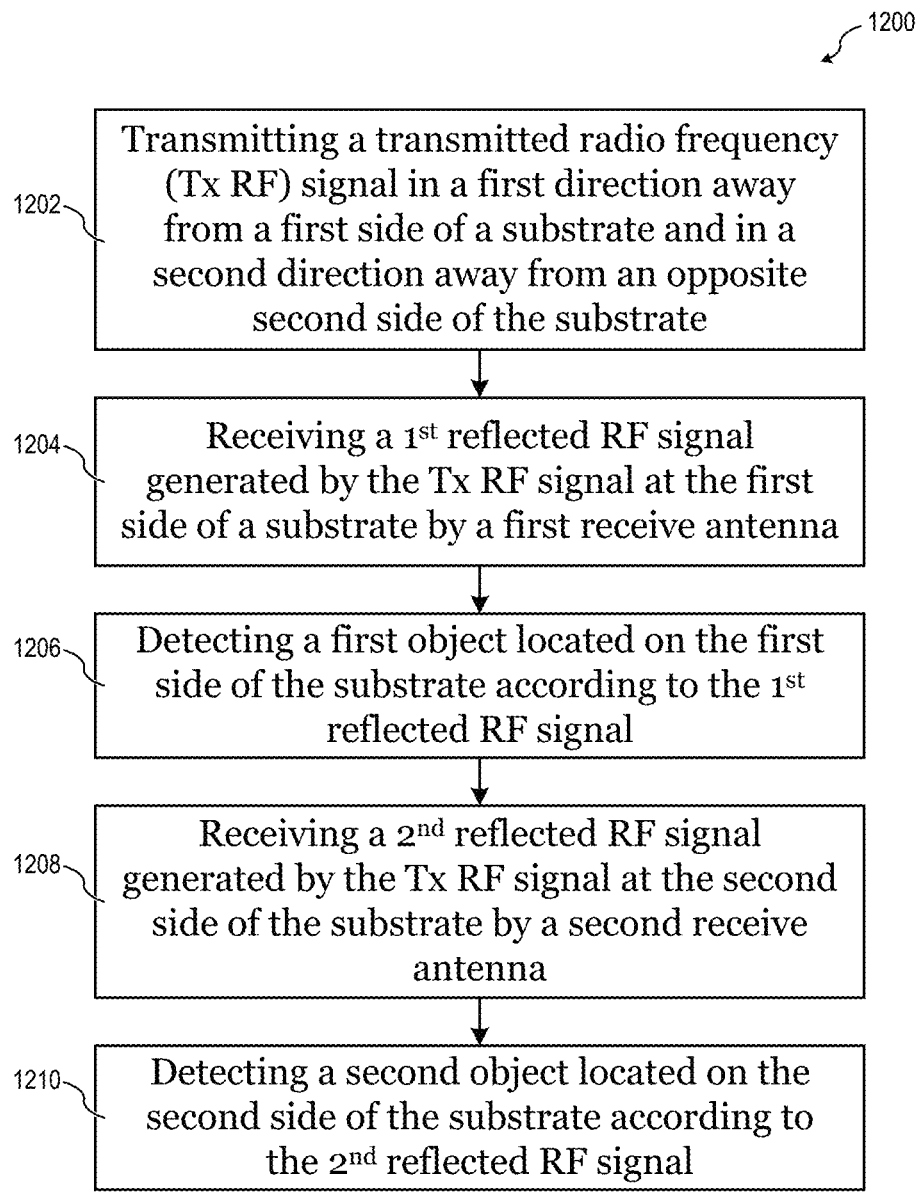
FIG. 12 illustrates a method of operating a radar system including detecting objects on opposing sides of a substrate in accordance with an embodiment of the invention.

FIG. 12 illustrates a method of operating a radar system including detecting objects on opposing sides of a substrate in accordance with an embodiment of the invention.

Referring to FIG. 12, a method 1200 of operating a radar system includes a step 1202 of transmitting a transmitted RF signal in a first direction away from a first side of a substrate and in a second direction away from an opposite second side of the substrate. Optionally, two separate RF signals may be transmitted in each of the first direction and the second direction. In this scenario, the two separate RF signals may be transmitted by the same transmit antenna or by different transmit antennas as previously described.

The method 1200 may further include a step 1204 of receiving a first reflected RF signal generated by the transmitted RF signal at the first side of the substrate by a first receive antenna followed by a step 1206 of detecting a first object located on the first side of the substrate according to the first reflected RF signal. The method 1200 also includes a step 1208 of receiving a second reflected RF signal generated by the transmitted RF signal at the second side of the substrate by a second receive antenna followed by a step 1210 of detecting a second object located on the second side of the substrate according to the second reflected RF signal.

Figure 13:
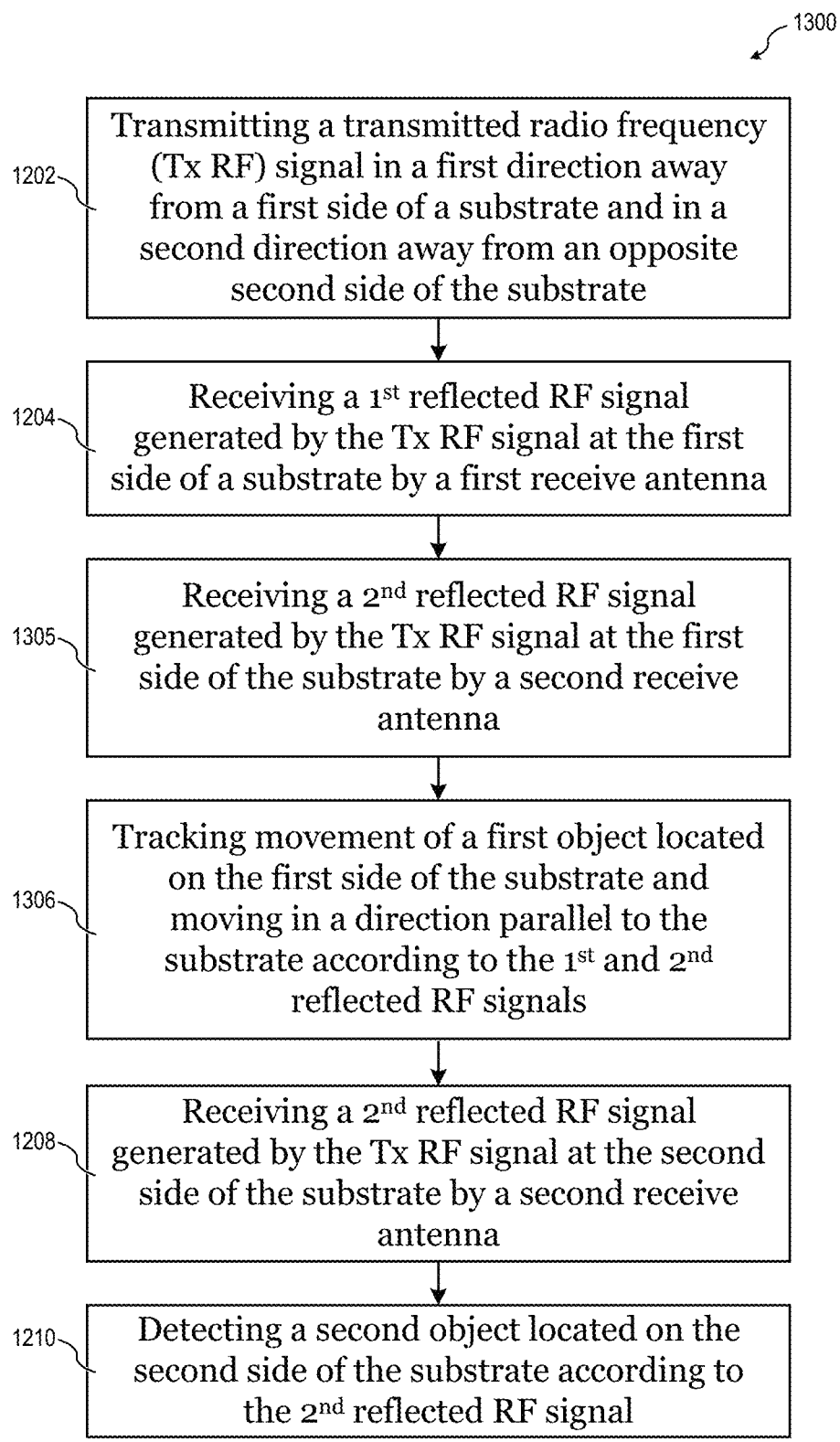
FIG. 13 illustrates a method of operating a radar system including tracking movement of an object on one side of a substrate and detecting another object on an opposing side of the substrate in accordance with an embodiment of the invention.

FIG. 13 illustrates a method of operating a radar system including tracking movement of an object on one side of a substrate and detecting another object on an opposing side of the substrate in accordance with an embodiment of the invention.

Referring to FIG. 13, a method 1300 of operating a radar system includes steps 1202, 1204, 1208, and 1210 as previously described in reference to method 1200 of FIG. 12. In contrast to method 1200, method 1300 includes a step 1305 of receiving a second reflected RF signal generated by the transmitted RF signal at the first side of the substrate by a second receive antenna.

The method 1300 further includes a step 1306 of tracking movement of a first object located on the first side of the substrate and moving in a direction parallel to the substrate according to the first and second reflected RF signals. Receiving a second reflected RF signal at the first side may increase the functionality of the radar system and allow for two-dimensional movement tracking including a direction parallel to the first surface of the substrate as well as a direction perpendicular to the surface of the substrate.

Figure 14:
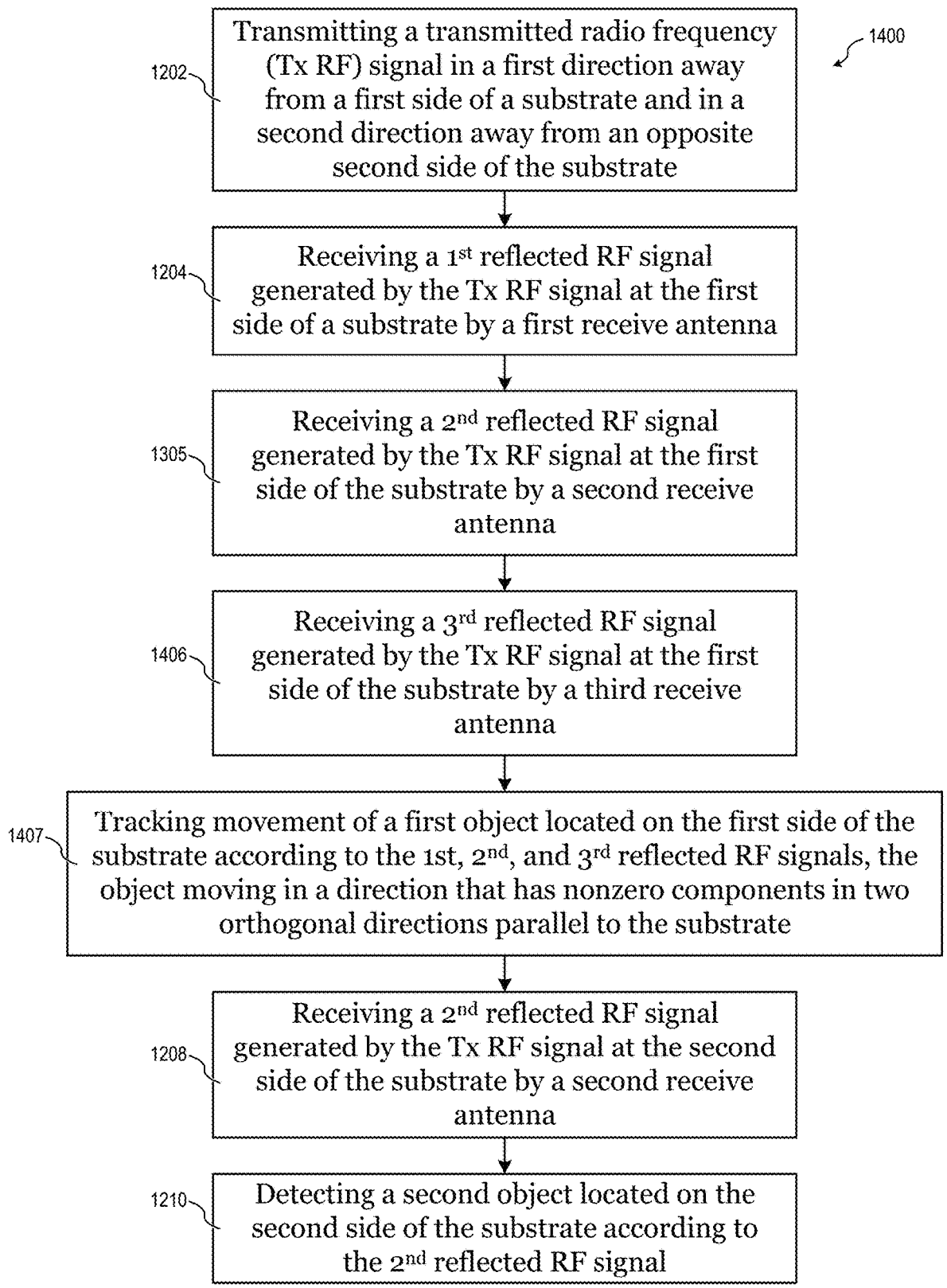
FIG. 14 illustrates a method of operating a radar system including tracking movement of an object in three dimensional space on one side of a substrate and detecting another object on an opposing side of the substrate in accordance with an embodiment of the invention.

FIG. 14 illustrates a method of operating a radar system including tracking movement of an object in three dimensional space on one side of a substrate and detecting another object on an opposing side of the substrate in accordance with an embodiment of the invention.

Referring to FIG. 14, a method 1400 of operating a radar system includes steps 1202, 1204, 1305, 1208, and 1210 as previously described in reference to method 1300 of FIG. 13. In addition to these steps, method 1400 includes a step 1406 of receiving a third reflected RF signal generated by the transmitted RF signal at the first side of the substrate by a third receive antenna.

The method 1400 further includes a step 1407 of tracking movement of a first object located on the first side of the substrate according to the first, second, and third reflected RF signals, the object moving in a direction that has nonzero components in two orthogonal directions parallel to the substrate. Similar to the increased functionality afforded to method 1300 over method 1200 by step 1305, step 1406 of method 1400 enables the additional functionality of step 1407. Alternatively, the step 1406 of receiving the third reflected RF signal may enable improved resolution in a direction parallel to the substrate rather than adding a third measureable component to the movement tracking.

FIGS. 15A, 15B, and 15C illustrate three example radar systems including a radar package where FIG. 15A illustrates a mobile phone, FIG. 15B, illustrates a pair of headphones, and FIG. 15C illustrates a personal assistant device in accordance with several embodiments of the invention.

The mobile phone, headphones, and personal assistant devices as well as other similar electronic devices may incorporate dual-sided radar packages as described in any of the various embodiments herein.

Referring to FIGS. 15A, 15B, and 15C, radar packages 58 are included in various electronic devices such as a mobile phone 1501, a pair of headphones 1502, and a personal assistant device 1503. Each radar package 58 is configured to transmit a front side transmitted RF signal 10 and a back side transmitted RF signal 20. In addition, each radar package 58 is further configured to receive a front side reflected RF signal 12 and a back side reflected RF signal 22. Each radar package 58 and RF signal may be as previously described in various embodiments.

The labels of "front side" and "back side" are merely convenient labels and may or may not have any direct meaning regarding the electronic device transmitting and receiving the RF signals. For example, in the case of mobile phone 1501 the front side and back side RF signals may correspond with what one may consider the front side and back side of the mobile phone 1501. Alternatively, in the case of the personal assistant device, the front side and back side RF signals may only correspond to sides of radar package 58 and may not correspond to a "front side" or "back side" of personal assistant device 1503.

The dual-sided radar package configuration as implemented in mobile phone 1501, headphones 1502, and personal assistant device 1503 may be advantageously configured to perform various control and monitoring functions congruent with desired functionality of the specific electronic device. For example, radar package 58 as implemented in mobile phone 1501 may be configured to be controlled using gesture sensing on the front side of the device as well as compensate for unwanted motion while using the front side camera. At the back side, radar package 58 of mobile phone 1501 may be configured to provide imaging functionality, object tracking and ranging, and compensation for unwanted motion while using the back side camera.

As another example, radar package 58 as implemented in headphones 1502 may be configured to determine whether headphones 1502 are currently being worn by a user and monitor various biometrics such as heart rate at a front side of radar package 58 while being configured to be controlled using gesture sensing at a back side of radar package 58. As still another example, radar package 58 as implemented in personal assistant device 1503 may be may be configured to use both sides of radar package 58 to provide gesture control and object tracking and ranging in a region around personal assistant device 1503. For example, radar package 58 may provide substantially 360° coverage around personal assistant device 1503. Alternatively, radar functionality may be provided on two sides of personal assistant device 1503 in to regions that are each defined by an angle less than 180°.

Example embodiments of the present invention are summarized here. Other embodiments can also be understood from the entirety of the specification as well as the claims filed herein.

Example 1. A radar system including: a substrate including a first surface and a second surface, the first surface being opposite the second surface; transmitter front-end circuitry attached to the substrate, the transmitter front-end circuitry being configured to transmit a transmitted radio frequency (RF) signal in a first direction away from the first surface and in a second direction away from the second surface; a first receive antenna disposed at the first surface, the first receive antenna being configured to receive a first reflected RF signal propagating in the second direction, the first reflected RF signal being generated by the transmitted RF signal; and a second receive antenna disposed at the second surface, the second receive antenna being configured to receive a second reflect RF signal propagating in the first direction, the second reflected RF signal being generated by the transmitted RF signal.

Example 2. The radar system of example 1, further including: RF circuitry disposed on the substrate, the RF circuitry being configured to detect a first object located in the first direction according to the first reflected RF signal, and detect a second object located in the second direction according to the second reflected RF signal.

Example 3. The radar system of one of examples 1 and 2, farther including: a housing fully enclosing the substrate, the transmitter front-end circuitry, the first receive antenna, and the second receive antenna, wherein the transmitter front-end circuitry is further configured to transmit the transmitted RF signal by transmitting the transmitted RF signal through a first surface and a second surface of a housing, the first surface being opposite the second surface, the first receive antenna is further configured to receive the first reflected RF signal by receiving the first reflected RF signal through the first surface of the housing, and the second receive antenna is further configured to receive the second reflected RF signal by receiving the second reflected RF signal through the second surface of the housing.

Example 4. The radar system of one of examples 1 to 3, further including: a third receive antenna disposed at the first surface of the substrate, the third receive antenna being configured to receive a third reflected RF signal generated by the transmitted RF signal, the third reflected RF signal propagating in the second direction; and RF circuitry disposed on the substrate, the RF circuitry being configured to track movement of an object moving in a third direction parallel to the first surface.

Example 5. The radar system of example 4, further including: a fourth receive antenna disposed at the first surface of the substrate, the fourth receive antenna being configured to receive a fourth reflected RF signal generated by the transmitted RF signal, the fourth reflected RF signal propagating in the second direction, wherein the RF circuitry is further configured to track movement of the object by tracking movement of the object in the third direction, and tracking movement of the object in a fourth direction, the fourth direction being both parallel to the first surface and perpendicular to the third direction.

Example 6. The radar system of one of examples 1 to 5, farther including: a transmit antenna disposed within the substrate and coupled to the transmitter front-end circuitry, the transmit antenna being configured to transmit the transmitted RF signal by transmitting a first transmitted RF signal in the first direction, and transmitting a second transmitted RF signal in the second direction.

Example 7. The radar system of one of examples 1 to 5, further including: a first transmit antenna disposed at the first surface and coupled to the transmitter front-end circuitry, the first transmit antenna being configured to transmit a first transmitted RF signal in the first direction; and a second transmit antenna disposed at the second surface and coupled to the transmitter front-end circuitry, the second transmit antenna being configured to transmit a second transmitted RF signal in the second direction.

Example 8. A method of operating a radar system, the method including: transmitting, by transmitter front-end circuitry attached to a substrate, a transmitted radio frequency (RF) signal in a first direction away from a first surface of the substrate and in a second direction away from a second surface of the substrate, the first direction being opposite the first direction; receiving, by a first receive antenna disposed at the first surface of the substrate, a first reflected RF signal generated by the transmitted RF signal, the first reflected RF signal propagating in the second direction; and receiving, by a second receive antenna disposed at the second surface of the substrate, a second reflected RF signal generated by the transmitted RF signal, the second reflected RF signal propagating in the first direction.

Example 9. The method of example 8, further including: detecting, by RF circuitry disposed on the substrate, a first object located in the first direction according to the first reflected RF signal; and detecting, by the RF circuitry, a second object located in the second direction according to the second reflected RF signal.

Example 10. The method of one of examples 8 and 9, wherein transmitting the transmitted RF signal includes transmitting the transmitted RF signal through a first surface and a second surface of a housing, the first surface being opposite the second surface, receiving the first reflected RF signal includes receiving the first reflected RF signal through the first surface of the housing, receiving the second reflected RF signal includes receiving the second reflected RF signal through the second surface of the housing, and the housing fully encloses the substrate, the transmitter front-end circuitry, the first receive antenna, and the second receive antenna.

Example 11. The method of one of examples 8 to 10, further including: receiving, by a third receive antenna disposed at the first surface of the substrate, a third reflected RF signal generated by the transmitted RF signal, the third reflected RF signal propagating in the second direction; and tracking movement of an object by RF circuitry disposed on the substrate, wherein the object is moving in a third direction parallel to the first surface.

Example 12. The method of example 11, further including: receiving, by a fourth receive antenna disposed at the first surface of the substrate, a fourth reflected RF signal generated by the transmitted RF signal, the fourth reflected RF signal propagating in the second direction, wherein tracking movement of the object includes tracking movement of the object in the third direction, and tracking movement of the object in a fourth direction, the fourth direction being both parallel to the first surface and perpendicular to the third direction.

Example 13. The method of one of examples 8 to 12, wherein transmitting the transmitted RF signal includes transmitting, by a transmit antenna disposed within the substrate and coupled to the transmitter front-end circuitry, a first transmitted RF signal in the first direction, and transmitting, by the transmit antenna, a second transmitted RF signal in the second direction.

Example 14. The method of one of examples 8 to 12, where transmitting the transmitted RF signal includes transmitting, by a first transmit antenna disposed at the first surface and coupled to the transmitter front-end circuitry, a first transmitted RF signal in the first direction, and transmitting, by a second transmit antenna disposed at the a second surface and coupled to the transmitter front-end circuitry, a second transmitted RF signal in the second direction.

Example 15. A method of forming a radar system, the method including: forming a first receive antenna and a first ground plane region by patterning a first conductive layer on a first surface of a first laminate layer of a radar package; forming a transmit antenna and a second ground plane region by patterning a second conductive layer on a second surface of the first laminate layer, the second surface being opposite the first surface; forming a second laminate layer of the radar package over the second conductive layer; forming a third conductive layer over the second laminate layer; forming a second receive antenna by patterning the third conductive layer; and attaching a radio frequency integrated circuit (RFIC) chip to the radar package, the RFIC being coupled to the transmit antenna, the first receive antenna, and the second receive antenna.

Example 16. The method of example 15, further including: forming a via passing through the first laminate layer from the first conductive layer to the second conductive layer, the via coupling the first ground plane region to the second ground plane region.

Example 17. The method of one of examples 15 and 16, further including: forming interconnects by patterning the third conductive layer; and attaching the radar package to a printed circuit board using the interconnects.

Example 18. The method of example 17, further including: enclosing the radar package and the printed circuit board in a housing, wherein the housing includes a first surface and a second surface, the first surface of the housing completely overlaps a first side of the radar package, the second surface of the housing completely overlaps a second side of the radar package opposite the first side.

Example 19. The method of one of examples 15 to 18, wherein forming the transmit antenna and the second ground plane region includes forming the transmit antenna by patterning a lower conductive layer of the second conductive layer, the lower conductive layer being on the second surface of the first laminate layer, forming an insulating layer over the lower conductive layer, forming an upper conductive layer of the second conductive layer over the insulating layer, and forming the second ground plane region by patterning the upper conductive layer.

Example 20. The method of one of examples 15 to 19, further including: forming a third receive antenna by patterning the first conductive layer, the third receive antenna being coupled to the RFIC chip; and forming a third ground plane region by patterning the second conductive layer, the third ground plane region being coupled to the second ground plane region.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming a radar system, the method comprising:
    forming a first receive antenna and a first ground plane region by patterning a first conductive layer on a first surface of a first laminate layer of a radar package;
    forming a transmit antenna and a second ground plane region by patterning a second conductive layer on a second surface of the first laminate layer, the second surface being opposite the first surface;
    forming a second laminate layer of the radar package over the second conductive layer;
    forming a third conductive layer over the second laminate layer;

forming a second receive antenna by patterning the third conductive layer; and attaching a radio frequency integrated circuit (RFIC) chip to the radar package, the RFIC being coupled to the transmit antenna, the first receive antenna, and the second receive antenna.

2. The method of claim 1, further comprising:
forming a via passing through the first laminate layer from the first conductive layer to the second conductive layer, the via coupling the first ground plane region to the second ground plane region.

3. The method of claim 1, further comprising:
forming interconnects by patterning the third conductive layer; and
attaching the radar package to a printed circuit board using the interconnects.

4. The method of claim 3, farther comprising:
enclosing the radar package and the printed circuit board in a housing, wherein
 a first surface of the housing completely overlaps a first side of the radar package,
 a second surface of the housing completely overlaps a second side of the radar package opposite the first side.

5. The method of claim 1, wherein forming the transmit antenna and the second ground plane region comprises
 forming the transmit antenna by patterning a lower conductive layer of the second conductive layer, the lower conductive layer being on the second surface of the first laminate layer,
 forming an insulating layer over the lower conductive layer,
 forming an upper conductive layer of the second conductive layer over the insulating layer, and
 forming the second ground plane region by patterning the upper conductive layer.

6. The method of claim 1, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region.

7. The method of claim 1, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region,
wherein forming the transmit antenna and the second ground plane region comprises forming the transmit antenna by patterning a lower conductive layer of the second conductive layer, the lower conductive layer being on the second surface of the first laminate layer,
 forming an insulating layer over the lower conductive layer,
 forming an upper conductive layer of the second conductive layer over the insulating layer, and
 forming the second ground plane region by patterning the upper conductive layer.

8. The method of claim 1, further comprising:
forming a third receive antenna by patterning the first conductive layer, the third receive antenna being coupled to the RFIC chip;

forming a third ground plane region by patterning the second conductive layer, the third ground plane region being coupled to the second ground plane region;
forming interconnects by patterning the third conductive layer; and
attaching the radar package to a printed circuit board using the interconnects.

9. The method of claim 1, further comprising:
forming a via passing through the first laminate layer from the first conductive layer to the second conductive layer, the via coupling the first ground plane region to the second ground plane region;
forming interconnects by patterning the third conductive layer; and
attaching the radar package to a printed circuit board using the interconnects.

10. The method of claim 9, wherein forming the transmit antenna and the second ground plane region comprises
 forming the transmit antenna by patterning a lower conductive layer of the second conductive layer, the lower conductive layer being on the second surface of the first laminate layer,
 forming an insulating layer over the lower conductive layer,
 forming an upper conductive layer of the second conductive layer over the insulating layer, and
 forming the second ground plane region by patterning the upper conductive layer.

11. The method of claim 10, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region.

12. A method of forming a radar system, the method comprising:
forming a first receive antenna and a first ground plane region by patterning a first conductive layer on a first surface of a first laminate layer of a radar package;
forming a transmit antenna and a second ground plane region by patterning a second conductive layer on a second surface of the first laminate layer, the second surface being opposite the first surface, wherein forming the transmit antenna and the second ground plane region comprises
 forming the transmit antenna by patterning a lower conductive layer of the second conductive layer, the lower conductive layer being on the second surface of the first laminate layer,
 forming an insulating layer over the lower conductive layer,
 forming an upper conductive layer of the second conductive layer over the insulating layer, and
 forming the second ground plane region by patterning the upper conductive layer;
forming a via passing through the first laminate layer from the first conductive layer to the second conductive layer, the via coupling the first ground plane region to the second ground plane region;
forming a second laminate layer of the radar package over the second conductive layer;
forming a third conductive layer over the second laminate layer;
forming a second receive antenna by patterning the third conductive layer; and attaching a radio frequency integrated circuit (RFIC) chip to the radar package, the RFIC being coupled to the transmit antenna, the first receive antenna, and the second receive antenna.

13. The method of claim 12, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region.

14. The method of claim 12, further comprising:
forming interconnects by patterning the third conductive layer; and
attaching the radar package to a printed circuit board using the interconnects.

15. The method of claim 14, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region.

16. The method of claim 14, further comprising:
enclosing the radar package and the printed circuit board in a housing, wherein
a first surface of the housing completely overlaps a first side of the radar package,
a second surface of the housing completely overlaps a second side of the radar package opposite the first side.

17. The method of claim 16, further comprising:
forming a third receive antenna by patterning the first conductive layer, the third receive antenna being coupled to the RFIC chip; and
forming a third ground plane region by patterning the second conductive layer, the third ground plane region being coupled to the second ground plane region.

18. A method of forming a radar system, the method comprising:

forming a first receive antenna and a first ground plane region by patterning a first conductive layer on a first surface of a first laminate layer of a radar package;
forming a transmit antenna and a second ground plane region by patterning a second conductive layer on a second surface of the first laminate layer, the second surface being opposite the first surface;
forming a via passing through the first laminate layer from the first conductive layer to the second conductive layer, the via coupling the first ground plane region to the second ground plane region;
forming a second laminate layer of the radar package over the second conductive layer;
forming a third conductive layer over the second laminate layer;
forming a second receive antenna by patterning the third conductive layer;
attaching a radio frequency integrated circuit (RFIC) chip to the radar package, the RFIC being coupled to the transmit antenna, the first receive antenna, and the second receive antenna;
forming a third receive antenna by patterning the first conductive layer, the third receive antenna being coupled to the RFIC chip; and
forming a third ground plane region by patterning the second conductive layer, the third ground plane region being coupled to the second ground plane region.

19. The method of claim 18, further comprising:
forming interconnects by patterning the third conductive layer; and
attaching the radar package to a printed circuit board using the interconnects.

20. The method of claim 19, further comprising:
enclosing the radar package and the printed circuit board in a housing, wherein
a first surface of the housing completely overlaps a first side of the radar package,
a second surface of the housing completely overlaps a second side of the radar package opposite the first side.

* * * * *

UNITED STATES PATENT AND TRADEMARK OFFICE
CERTIFICATE OF CORRECTION

PATENT NO.      : 11,733,347 B2
APPLICATION NO. : 17/175095
DATED           : August 22, 2023
INVENTOR(S)     : Trotta et al.

It is certified that error appears in the above-identified patent and that said Letters Patent is hereby corrected as shown below:

In the Claims

In Column 25, in Claim 4, Line 18, delete "farther" and insert -- further --.

Signed and Sealed this
Nineteenth Day of December, 2023

Katherine Kelly Vidal
*Director of the United States Patent and Trademark Office*